United States Patent
Nagano et al.

(10) Patent No.: US 12,522,740 B2
(45) Date of Patent: Jan. 13, 2026

(54) AQUEOUS PIGMENT DISPERSION

(71) Applicant: KAO CORPORATION, Tokyo (JP)

(72) Inventors: Tomohiko Nagano, Wakayama (JP); Shimpei Kobayashi, Wakayama (JP); Hiroto Soma, Wakayama (JP); Shu Nagashima, Wakayama (JP); Yuki Ozaki, Wakayama (JP)

(73) Assignee: KAO CORPORATION, Tokyo (JP)

( * ) Notice: Subject to any disclaimer, the term of this patent is extended or adjusted under 35 U.S.C. 154(b) by 182 days.

(21) Appl. No.: 18/551,074

(22) PCT Filed: Mar. 18, 2022

(86) PCT No.: PCT/JP2022/012661
§ 371 (c)(1),
(2) Date: Sep. 18, 2023

(87) PCT Pub. No.: WO2022/202675
PCT Pub. Date: Sep. 29, 2022

(65) Prior Publication Data
US 2024/0174875 A1    May 30, 2024

(30) Foreign Application Priority Data
Mar. 24, 2021 (JP) .................... 2021-049916

(51) Int. Cl.
| | | |
|---|---|---|
| *C09D 11/326* | (2014.01) | |
| *B41J 2/01* | (2006.01) | |
| *C08G 63/183* | (2006.01) | |
| *C09D 11/104* | (2014.01) | |
| *C09D 11/322* | (2014.01) | |
| *C09D 17/00* | (2006.01) | |
| *C09D 167/02* | (2006.01) | |

(52) U.S. Cl.
CPC .............. *C09D 11/326* (2013.01); *B41J 2/01* (2013.01); *C08G 63/183* (2013.01); *C09D 11/104* (2013.01); *C09D 11/322* (2013.01); *C09D 17/001* (2013.01); *C09D 167/02* (2013.01)

(58) Field of Classification Search
CPC ............ B41J 2/01; B41J 2/211; B41J 2/1433; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 2/1623; B41J 2202/00; B41J 2202/03; B41J 2/14201; B41J 2/045; B41J 11/0015; B41J 11/002; B41J 2/04581; B41J 2/055; B41J 2/16538; B41J 2002/16502; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 15/04; B41J 25/001; B41J 25/34; B41J 25/003; B41J 2/18; B41J 25/312; B41J 2025/008; B41J 2202/21; B41J 2/17596; B41J 2/16508; B41J 2/1652; B41J 2/175; B41J 2/17563; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106; C09D 11/326; C09D 11/107; C09D 11/03; C09D 11/037; C09D 11/033; B41M 5/0011; B41M 5/0017; B41M 5/0023; B41M 5/0047; B41M 7/00; B41M 7/0072; B41M 5/52; B41M 5/5218; B41M 5/5227
See application file for complete search history.

(56) References Cited

U.S. PATENT DOCUMENTS

| | | | | |
|---|---|---|---|---|
| 2002/0128356 A1* | 9/2002 | Nakamura | ................. | B01J 2/02 523/160 |
| 2002/0156226 A1* | 10/2002 | Matsumoto | .............. | C09D 5/03 528/44 |
| 2002/0193556 A1* | 12/2002 | Kitahara | ................. | C08L 23/16 528/272 |
| 2003/0152779 A1* | 8/2003 | Kondo | ................. | C09D 175/04 428/424.2 |
| 2003/0157338 A1* | 8/2003 | Kondo | ................. | C09D 175/04 156/60 |
| 2005/0143491 A1* | 6/2005 | Aoshima | .............. | C09D 11/326 523/160 |
| 2005/0143492 A1* | 6/2005 | Kasai | ..................... | C09D 11/30 523/160 |
| 2008/0268269 A1* | 10/2008 | Kobata | ................ | C09D 133/14 526/278 |

(Continued)

FOREIGN PATENT DOCUMENTS

| | | |
|---|---|---|
| CN | 112538291 A | 3/2021 |
| JP | 2002-60656 A | 2/2002 |

(Continued)

OTHER PUBLICATIONS

Extended European Search Report issued Feb. 24, 2025 in European Patent Application No. 22775463.7, 10 pages.
International Search Report issued on May 31, 2022 in PCT/JP2022/012661 (with English translation), 7 pages.

*Primary Examiner* — Manish S Shah
(74) *Attorney, Agent, or Firm* — Oblon, McClelland, Maier & Neustadt, L.L.P.

(57) ABSTRACT

A pigment water dispersion, including pigment-containing polyester resin particles. The polyester resin contains a constitutional unit derived from an alcohol component and a constitutional unit derived from a carboxylic acid component, the alcohol component contains 3-methyl-1,5-pentanediol, and an average particle size of the pigment-containing resin particles is not less than 60 nm and not more than 350 nm.

22 Claims, No Drawings

(56) References Cited

U.S. PATENT DOCUMENTS

| | | | |
|---|---|---|---|
| 2021/0237415 A1 | 8/2021 | Sato et al. | |
| 2021/0340399 A1 | 11/2021 | Sato et al. | |
| 2022/0298398 A1 | 9/2022 | Sato et al. | |

FOREIGN PATENT DOCUMENTS

| | | | |
|---|---|---|---|
| JP | 2004-300393 A | 10/2004 | |
| JP | 2005-29619 A | 2/2005 | |
| JP | 2018-87320 A | 6/2018 | |
| JP | 2020-29484 A | 2/2020 | |
| JP | 2020-85927 A | 6/2020 | |
| JP | WO 2020/174784 A1 | 9/2020 | |
| JP | 2020-186344 A | 11/2020 | |
| JP | 2021-31169 A | 3/2021 | |
| JP | 2022-22990 A | 2/2022 | |

\* cited by examiner

AQUEOUS PIGMENT DISPERSION

CROSS REFERENCE TO RELATED APPLICATIONS

This application is a National Stage entry under 35 U.S.C. § 371 of PCT/JP2022/012661, filed on Mar. 18, 2022, and claims priority to Japanese Patent Application No. 2021-049916, filed on Mar. 24, 2021. The entire contents of both are incorporated herein by reference.

FIELD OF THE INVENTION

The present invention relates to a pigment water dispersion, and a water-based ink containing the pigment water dispersion.

BACKGROUND OF THE INVENTION

In ink-jet printing methods, droplets of ink are directly ejected from fine nozzles and allowed to adhere to a printing medium to obtain a printed material on which characters or images are printed. The ink-jet printing methods have become rapidly spread because of various advantages such as easiness of full coloration, low cost, capability of using a plain paper as the printing medium, non-contact of a printing apparatus with the printing medium, etc.

In recent years, from the standpoint of imparting good weather resistance or water resistance to a printed material as well as from the standpoint of reducing a burden on working environments and natural environments, there have been noticed water-based pigment inks in which a pigment is used as a colorant and dispersed in the inks with a polymer.

On the other hand, the water-based pigment inks have posed such a problem that the inks are deteriorated in storage stability or ejection stability owing to the existence of coarse particles derived from the pigment or the polymer in the inks.

Under these circumstances, various proposals have been made in order to improve storage stability or ejection stability of the inks.

For example, JP 2002-60656A (Patent Literature 1) discloses, as an aqueous pigment ink for ink-jet printing which is excellent in long-term storage stability, in particular, excellent in intermittent ejection stability after interruption of printing as well as storage/ejection stability upon using an ink reservoir and a print head again after allowing them to stand in such a state as detached from each other for a long period of time, and is capable of stably printing images having good quality, a pigment ink for ink-jet printing which contains a pigment and an aqueous polyester copolymer.

SUMMARY OF THE INVENTION

The present invention relates to a pigment water dispersion containing pigment-containing polyester resin particles, in which an alcohol component that forms a constitutional unit of the polyester resin contains 3-methyl-1,5-pentanediol.

DETAILED DESCRIPTION OF THE INVENTION

In the commercial and industrial printing application fields, a pigment water dispersion or an ink is generally supplied to ejection nozzles through a main tank, a secondary tank, and an ink cartridge. The pigment water dispersion or ink accommodated in the main tank tends to be frequently stored therein for a long period of time. For this reason, it has been required that the pigment water dispersion or ink has good dispersion stability, and a precipitate produced by long-term storage of the pigment water dispersion or ink exhibits good re-dispersibility.

On the other hand, the ink used for printing on a low-liquid absorbing coated paper, a non-liquid absorbing resin film or the like tends to be hardly penetrated into these substrates, so that there tends to occur such a problem that the resulting printed material is deteriorated in substrate-adhesion properties, rub fastness, and solvent resistance.

The conventional water-based inks as described in the Patent Literature 1, etc., tend to be insufficient in re-dispersibility, and a printed material obtained using the inks tends to be insufficient in rub fastness, etc. Therefore, it has been desired that the conventional water-based inks are further improved in properties thereof.

The present invention relates to a pigment water dispersion that is excellent in dispersion stability and re-dispersibility after long-term storage, and a water-based ink that is excellent in long-term dispersion stability, and is capable of providing a printed material that is excellent in substrate-adhesion properties, rub fastness, and solvent resistance.

The present inventors have found that by using a polyester resin that contains a constitutional unit derived from 3-methyl-1,5-pentanediol as a pigment-dispersing polymer, the resulting pigment water dispersion is free of inclusion of coarse particles owing to aggregation of the ink even after being stored for a long period of time, and the water-based ink containing the pigment water dispersion can exhibit good printing performance even after being stored for a long period of time, so that it is possible to solve the aforementioned conventional problems.

That is, the present invention relates to the following aspects [1] and [2].

[1] A pigment water dispersion containing pigment-containing polyester resin particles, in which an alcohol component that forms a constitutional unit of the polyester resin contains 3-methyl-1,5-pentanediol.

[2] A water-based ink containing the pigment water dispersion described in the above aspect [1], and a water-soluble organic solvent.

In accordance with the present invention, it is possible to provide a pigment water dispersion that is excellent in dispersion stability and re-dispersibility after long-term storage, and a water-based ink that is excellent in long-term dispersion stability, and is capable of providing a printed material that is excellent in substrate-adhesion properties, rub fastness, and solvent resistance.

Pigment Water Dispersion

The pigment water dispersion of the present invention contains pigment-containing polyester resin particles, in which an alcohol component that forms a constitutional unit of the polyester resin contains 3-methyl-1,5-pentanediol.

Meanwhile, the term "pigment water dispersion" as used in the present specification means that water has a largest content in terms of its mass ratio among components of a medium for dispersing the pigment.

In addition, the term "printing" as used herein means a concept that includes printing or typing operation for printing characters or images, and the term "printed material" as used herein means a concept that includes printed matters or typed materials on which characters or images are printed.

The term "low-liquid absorbing properties" of the printing medium as used herein is intended to include both concepts of low-liquid absorbing properties and non-liquid absorbing properties, and means that a water absorption of the printing medium is not less than 0 g/m² and not more than 10 g/m² as measured under the condition that a contact time between the printing medium and pure water is 100 milliseconds.

The pigment water dispersion of the present invention is excellent in dispersion stability and re-dispersibility after long-term storage, and the water-based ink of the present invention is excellent in long-term dispersion stability, and is capable of providing a printed material that is excellent in substrate-adhesion properties, rub fastness, and solvent resistance. The reason why the aforementioned advantageous effects can be attained by the present invention is considered as follows though it is not clearly determined yet.

In the pigment water dispersion and the water-based ink according to the present invention, the polyester resin used therein contains a constitutional unit derived from 3-methyl-1,5-pentanediol.

It is considered that the polyester resin serves for enhancing affinity between images obtained by drying the water-based ink and a non-liquid absorbing printing medium, and improving substrate-adhesion properties and rub fastness of the resulting printed material. In addition, since the polyester resin is hardly swellable with alcohols, such as ethanol, isopropanol, etc., it is considered that the polyester resin serves for improving solvent resistance of the resulting printed material against these alcohols, etc.

Moreover, the polyester resin has such a structure that respective main skeletons of an alcohol component and an acid component of the polyester resin, and ester groups, are alternately bonded to each other. Therefore, it is considered that the relatively hydrophobic main skeletons contribute to adsorption of the polyester resin to the pigment. In this case, it is considered that since the methyl group present on the side chain of 3-methyl-1,5-pentanediol acts like an anchor and is adsorbed onto the pigment, it is possible to attain excellent balance between flexibility of the main skeletons of the polyester resin and adsorptivity of the polyester resin to the surface of the pigment owing to the hydrophobic side chain of 3-methyl-1,5-pentanediol.

For this reason, the polyester resin according to the present invention is stably adsorbed onto the pigment without being partially desorbed from the pigment even after being stored for a long period of time, so that it is possible to inhibit formation of coarse particles owing to aggregation thereof. As a result, it is considered that the pigment water dispersion of the present invention is excellent in dispersion stability and re-dispersibility after long-term storage, and the water-based ink of the present invention is excellent in long-term dispersion stability, and is capable of providing a printed material that is excellent in substrate-adhesion properties, rub fastness, and solvent resistance.

Pigment-Containing Polyester Resin Particles

The pigment used in the present invention is contained in the form of pigment-containing polyester resin particles in the pigment water dispersion or the water-based ink from the viewpoint of improving dispersion stability and re-dispersibility after long-term storage of the pigment water dispersion, long-term dispersion stability of the water-based ink of the present invention, and substrate-adhesion properties, rub fastness, and solvent resistance of the resulting printed material.

The "pigment-containing polyester resin particles" as used in the present specification (hereinafter also referred to as "pigment-containing resin particles") include particles having a configuration in which the pigment is included in the polyester resin, particles having a configuration in which the pigment is partially exposed to a surface of respective particles formed of the polyester resin and the pigment, particles having a configuration in which the polyester resin is adsorbed to a part of the pigment, and particles having a mixed structure of these configurations. Among these configurations of the particles, preferred is the configuration of the polyester resin particles into which the pigment is incorporated.

Pigment

The pigment used in the present invention may be either an inorganic pigment or an organic pigment, and may also be used in the form of a lake pigment or a fluorescent pigment. In addition, the inorganic or organic pigment may also be used in combination with an extender pigment, if required.

Specific examples of the inorganic pigment include carbon blacks, metal oxides, such as titanium oxide, iron oxide, red iron oxide, chromium oxide, etc., iridescent nacreous pigments, and the like. Examples of the carbon blacks include furnace blacks, lamp blacks, acetylene blacks, channel blacks, and the like.

Specific examples of the organic pigment include azo pigments, such as azo lake pigments, insoluble monoazo pigments, insoluble disazo pigments, chelate azo pigments, etc.; polycyclic pigments, such as phthalocyanine pigments, perylene pigments, perinone pigments, anthraquinone pigments, quinacridone pigments, dioxazine pigments, thioindigo pigments, isoindolinone pigments, quinophthalone pigments, diketopyrrolopyrrole pigments, benzimidazolone pigments, three pigments, etc.; and the like.

The hue of the pigment is not particularly limited, and there may be used any of achromatic color pigments, such as a white pigment, a black pigment, a gray pigment, etc.; and chromatic color pigments, such as a yellow pigment, a magenta pigment, a cyan pigment, a blue pigment, a red pigment, an orange pigment, a green pigment, etc.

Specific examples of the preferred organic pigments include one or more pigments selected from the group consisting of commercially available products marketed under the names of C.I. Pigment Yellow, C.I. Pigment Red, C.I. Pigment Orange, C.I. Pigment Violet, C.I. Pigment Blue, and C.I. Pigment Green with various part numbers.

Examples of the extender pigment include silica, calcium carbonate, talc, and the like.

The aforementioned pigments may be used alone or in the form of a mixture of any two or more thereof.

Polyester Resin

The polyester resin used in the present invention contains a constitutional unit derived from an alcohol component and a constitutional unit derived from a carboxylic acid component, and may be obtained by subjecting the alcohol component and the carboxylic acid component to polycondensation reaction.

Alcohol Component

The alcohol component as a raw material monomer of the polyester resin contains 3-methyl-1,5-pentanediol from the viewpoint of improving dispersion stability of the pigment, and improving re-dispersibility after long-term storage, long-term dispersion stability, substrate-adhesion properties, rub fastness, etc., of the resulting pigment water dispersion or water-based ink, as well as from the viewpoint of enhancing ejection properties after long-term storage of the ink obtained using the pigment water dispersion of the present invention.

It is considered that since the methyl group present on the side chain of 3-methyl-1,5-pentanediol acts like an anchor and is adsorbed onto the pigment, the polyester resin is hardly desorbed from the pigment even after being stored for a long period of time, stably adsorbed onto the pigment, and can be inhibited from suffering from formation of coarse particles owing to aggregation thereof.

The content of 3-methyl-1,5-pentanediol in the alcohol component is preferably not less than 5 mol %, more preferably not less than 8 mol %, and even more preferably not less than 10 mol %, and is also preferably not more than 95 mol %, more preferably not more than 90 mol %, and even more preferably not more than 85 mol %, from the same viewpoint as described above.

In the present invention, the alcohol component preferably contains at least one compound selected from the group consisting of an aromatic diol, an aliphatic diol and an alicyclic diol, and more preferably at least one compound selected from the group consisting of an aromatic diol and an aliphatic diol, in addition to 3-methyl-1,5-pentanediol.

The aromatic diol is preferably at least one compound selected from the group consisting of an alkyleneoxide adduct of bisphenol A and a hydrogenated bisphenol A, and more preferably a hydrogenated bisphenol A.

The aliphatic diol is preferably at least one compound selected from the group consisting of 1,2-propanediol, 2,3-butanediol, 2,4-pentanediol, 2,5-hexanediol, 2,6-heptanediol, and 2,7-octanediol, more preferably at least one compound selected from the group consisting of 1,2-propanediol and 2,3-butanediol, and even more preferably 2,3-butanediol.

The alicyclic diol is preferably at least one compound selected from the group consisting of 1,4-cyclohexanediol and 1,4-cyclohexanedimethanol, and more preferably 1,4-cyclohexanediol.

From the same viewpoint as described above, the polyester resin preferably contains a constitutional unit derived from 3-methyl-1,5-pentanediol, and a constitutional unit derived from at least one alcohol component selected from the group consisting of an alkyleneoxide adduct of bisphenol A, a hydrogenated bisphenol A, and 2,3-butanediol.

The alkyleneoxide adduct of bisphenol A as used herein means a whole structure of a compound formed by adding an oxyalkylene group to 2,2-bis(4-hydroxyphenyl)propane.

More specifically, the alkyleneoxide adduct of bisphenol A is preferably a compound represented by the following general formula (I), and the two or more compounds may be used in combination with each other as long as these compounds lie within the range.

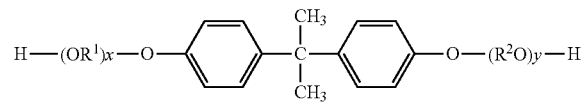
(I)

In the general formula (I), $OR^1$ and $R^2O$ are each independently an oxyalkylene group having not less than 1 and not more than 4 carbon atoms, and preferably an oxyethylene group or an oxypropylene group.

The suffixes x and y each represent a molar number of addition of the alkyleneoxide, and are each independently a positive number of not less than 0. From the viewpoint of attaining good reactivity with the carboxylic acid component, the average value of sums of x and y is preferably not less than 2, and is also preferably not more than 7, more preferably not more than 5, and even more preferably not more than 3.

In addition, the $OR^1$ groups and the $R^2O$ groups may be respectively the same or different from each other. From the viewpoint of exhibiting the advantageous effects of the present invention, the $R^1O$ groups and the $R^2O$ groups are respectively preferably identical to each other.

As the alkyleneoxide adduct of bisphenol A, preferred are a propyleneoxide adduct of bisphenol A and an ethyleneoxide adduct of bisphenol A, and more preferred is a propyleneoxide adduct of bisphenol A.

The hydrogenated bisphenol A is a hydrogenated product of a bisphenol compound (2,2'-bis(4-hydroxycyclohexyl)propane).

The content of the at least one compound selected from the group consisting of the aromatic diol, the aliphatic diol and the alicyclic diol in the alcohol component is preferably not less than 5 mol %, more preferably not less than 10 mol %, and even more preferably not less than 15 mol %, and is also preferably not more than 96 mol %, more preferably not more than 95 mol %, even more preferably not more than 94 mol %, further even more preferably not more than 92 mol %, and still further even more preferably not more than 90 mol %, from the viewpoint of improving dispersion stability of the pigment, and improving re-dispersibility after long-term storage, long-term dispersion stability, substrate-adhesion properties, rub fastness, etc., of the resulting pigment water dispersion or water-based ink.

Carboxylic Acid Component

Examples of the carboxylic acid component as a raw material monomer of the polyester resin include carboxylic acids as well as anhydrides and alkyl (having not less than 1 and not more than 3 carbon atoms) esters of these carboxylic acids, and the like.

Specific examples of the carboxylic acid component include an aromatic dicarboxylic acid, an aliphatic dicarboxylic acid, an alicyclic dicarboxylic acid, and a trivalent or higher-valent polycarboxylic acid.

As the aromatic dicarboxylic acid, preferred are phthalic acid, isophthalic acid, and terephthalic acid, and more preferred is terephthalic acid.

Examples of the aliphatic dicarboxylic acid include an unsaturated aliphatic dicarboxylic acid and a saturated aliphatic dicarboxylic acid. As the unsaturated aliphatic dicarboxylic acid, preferred are fumaric acid and maleic acid, and more preferred is fumaric acid. As the saturated aliphatic dicarboxylic acid, preferred are adipic acid and succinic acid, and more preferred is adipic acid.

As the alicyclic dicarboxylic acid, preferred are cyclohexanedicarboxylic acid, decalinedicarboxylic acid, and tetrahydrophthalic acid.

As the trivalent or higher-valent polycarboxylic acid, preferred are trimellitic acid and pyromellitic acid, and trimellitic anhydride is also preferably used.

The aforementioned carboxylic acid components may be used alone or in combination of any two or more thereof.

From the viewpoint of exhibiting the advantageous effects of the present invention, the aforementioned carboxylic acid component preferably includes at least one compound selected from the group consisting of an aromatic dicarboxylic acid, an aliphatic dicarboxylic acid and a trivalent or higher-valent polycarboxylic acid, and more preferably includes a combination of an aromatic dicarboxylic acid and a trivalent or higher-valent polycarboxylic acid.

From the same viewpoint as described above, the polyester resin preferably contains a constitutional unit derived from 3-methyl-1,5-pentanediol, a constitutional unit derived from at least one alcohol component selected from the group consisting of an alkyleneoxide adduct of bisphenol A, a hydrogenated bisphenol A and 2,3-butanediol, and a constitutional unit derived from a carboxylic acid component including an an aromatic dicarboxylic acid, and more preferably contains a constitutional unit derived from 3-methyl-1,5-pentanediol, a constitutional unit derived from at least one alcohol component selected from the group consisting of an alkyleneoxide adduct of bisphenol A, a hydrogenated bisphenol A and 2,3-butanediol, a constitutional unit derived from an aromatic dicarboxylic acid, and a constitutional unit derived from a trivalent or higher-valent polycarboxylic acid.

Production of Polyester Resin

The polyester resin may be obtained by adequately combining the alcohol component and the carboxylic acid component with each other and subjecting these components to polycondensation reaction. The polyester resin may be produced, for example, by subjecting the alcohol component and the carboxylic acid component to polycondensation reaction at a temperature of not lower than 150° C. and not higher than 250° C. in an inert gas atmosphere, and, if required, in the presence of an esterification catalyst.

Examples of the esterification catalyst include a tin catalyst, a titanium catalyst, a metal compound, such as antimony trioxide, zinc acetate, germanium dioxide, etc., and the like. Of these esterification catalysts, the tin catalyst is preferably used from the viewpoint of attaining a high esterification reaction efficiency. As the tin catalyst, preferred are dibutyl tin oxide, tin (II) di(2-ethyl hexanoate), salts of these compounds, and the like, and more preferred is tin (II) di(2-ethyl hexanoate). If required, there may be further used an esterification co-catalyst, such as gallic acid, etc.

In addition, a radical polymerization inhibitor, such as 4-tert butyl catechol, etc., may also be used in combination with the aforementioned components.

The polyester resin preferably contains acid groups from the viewpoint of improving dispersion stability of the pigment, and improving re-dispersibility after long-term storage, long-term dispersion stability, substrate-adhesion properties, rub fastness, etc., of the resulting pigment water dispersion or water-based ink.

The acid value of the polyester resin is preferably not less than 10 mgKOH/g, more preferably not less than 15 mgKOH/g, even more preferably not less than 17 mgKOH/g, and further even more preferably not less than 23 mgKOH/g, and is also preferably not more than 100 mgKOH/g, more preferably not more than 80 mgKOH/g, even more preferably not more than 60 mgKOH/g, further even more preferably not more than 40 mgKOH/g, still further even more preferably not more than 34 mgKOH/g, and yet still further even more preferably not more than 30 mgKOH/g.

From the same viewpoint as described above, the softening point of the polyester resin is preferably not lower than 90° C., more preferably not lower than 100° C., and even more preferably not lower than 110° C., and is also preferably not higher than 180° C., more preferably not higher than 160° C., even more preferably not higher than 150° C., further even more preferably not higher than 140° C., still further even more preferably not higher than 125° C., and yet still further even more preferably not higher than 120° C.

From the same viewpoint as described above, the glass transition temperature of the polyester resin is preferably not lower than 35° C., more preferably not lower than 40° C., and even more preferably not lower than 45° C., and is also preferably not higher than 100° C., more preferably not higher than 98° C., even more preferably not higher than 95° C., further even more preferably not higher than 80° C., and still further even more preferably not higher than 70° C.

From the same viewpoint as described above, the weight-average molecular weight of the polyester resin is preferably not less than 5,000, more preferably not less than 10,000, and even more preferably not less than 12,000, and is also preferably not more than 100,000, more preferably not more than 80,000, even more preferably not more than 60,000, and further even more preferably not more than 25,000.

The acid value, the softening point, the glass transition temperature and the weight average molecular weight of the polyester resin may be measured by the respective methods described in Examples below. In addition, these properties may be respectively adjusted to desired values by appropriately controlling the kinds and compounding ratios of the monomers used as well as the polycondensation reaction conditions such as reaction temperature and reaction time.

The polyester resin is preferably water-insoluble.

The term "water-insoluble" of the polyester resin as used herein means that when the polyester resin is dried to a constant weight at 105° C. for 2 hours and then dissolved in 100 g of water at 25° C., the solubility in water of the polyester resin is not more than 10 g. The solubility in water of the polyester resin is preferably not more than 5 g, and more preferably not more than 1 g. In the case where the polyester resin contains acid groups, the aforementioned solubility means a solubility in water of the polyester resin whose acid groups are neutralized completely (i.e., 100%) with sodium hydroxide.

Production of Pigment-Containing Resin Particles

The pigment-containing resin particles may be efficiently produced in the form of a pigment water dispersion thereof by a process including the following step 1. In addition, the process may further include a crosslinking step, if required.

Step 1: subjecting a pigment mixture containing the pigment, the polyester resin, and water, and, if required, further containing a neutralizing agent, a surfactant, etc., to dispersion treatment to obtain the pigment water dispersion of the pigment-containing polyester resin particles.

Step 1

The polyester resin contains carboxy groups derived from the carboxylic acid component. From the viewpoint of improving dispersion stability, substrate-adhesion properties, rub fastness, etc., of the resulting pigment water dispersion or water-based ink, it is preferred that the carboxy groups of the polyester resin are at least partially neutralized with a neutralizing agent.

When neutralizing the carboxy groups of the polyester resin, the neutralization is preferably conducted such that the pH value of the resulting pigment water dispersion falls within the range of not less than 7 and not more than 11.

Examples of the neutralizing agent include bases, such as sodium hydroxide, potassium hydroxide, ammonia, various amines, and the like. Among these neutralizing agents, preferred are sodium hydroxide and ammonia. In addition, the polyester resin may be previously neutralized.

From the same viewpoint as described above, the equivalent amount of the neutralizing agent used is preferably not less than 20 mol %, more preferably not less than 40 mol %, and even more preferably not less than 50 mol %, and is also preferably not more than 150 mol %, more preferably not more than 120 mol %, and even more preferably not more than 100 mol %.

The equivalent amount of the neutralizing agent used as defined herein may be calculated and determined according to the following formula.

Equivalent amount (mol %) of neutralizing agent used= [{mass (g) of neutralizing agent added/equivalent of neutralizing agent}/[{acid value (mgKOH/g) of polyester resin before being neutralized×mass (g) of polyester resin before being neutralized}/(56×1,000)]]×100.

The dispersion treatment of the step 1 may be conducted by conventionally known methods. In the dispersion treatment, the pigment particles may be atomized into fine particles having a desired particle size only by substantial dispersion treatment in which a shear stress is applied to the pigment particles. However, it is preferred that the pigment mixture is first subjected to preliminary dispersion treatment, and then further to the substantial dispersion treatment, from the viewpoint of obtaining a uniform pigment water dispersion.

Examples of a disperser used in the preliminary dispersion treatment include ordinarily mixing and stirring devices, such as an anchor blade, a disper blade, etc.

Examples of a disperser used in the substantial dispersion treatment include kneading machines, such as roll mills, kneaders, etc.; high-pressure homogenizers, such as "Microfluidizer", etc.; and media-type dispersers, such as paint shakers, beads mills, etc. Among these dispersers, the high-pressure homogenizers are preferably used from the viewpoint of reducing the particle size of the pigment.

In the case where the dispersion treatment is conducted using the high-pressure homogenizer, by suitably controlling the treating pressure as well as the number of passes through the disperser, it is possible to suitably control the average particle size of the pigment particles in the pigment water dispersion.

From the viewpoint of enhancing productivity and attaining good cost efficiency, the treating pressure used in the dispersion treatment is preferably not less than 60 MPa and not more than 300 MPa, and the number of passes through the disperser is preferably not less than 3 and not more than 30.

In the case where the pigment mixture contains an organic solvent, the organic solvent may be removed from the resulting dispersion by conventionally known methods, whereby it is possible to obtain the aforementioned pigment water dispersion.

The solid content of the pigment water dispersion is preferably not less than 10% by mass and more preferably not less than 15% by mass, and is also preferably not more than 40% by mass and more preferably not more than 35% by mass, from the viewpoint of improving dispersion stability of the pigment water dispersion as well as from the viewpoint of facilitating production of the ink. The solid content may be measured by the method described in Examples below.

The average particle size of the pigment-containing resin particles in the pigment water dispersion is preferably not less than 60 nm, more preferably not less than 70 nm and even more preferably not less than 80 nm, and is also preferably not more than 350 nm, more preferably not more than 300 nm, even more preferably not more than 200 nm, and further even more preferably not more than 170 nm, from the viewpoint of improving storage stability of the pigment water dispersion.

The average particle size may be measured by the method descried in Examples below.

Contents of Respective Components in Pigment Water Dispersion

The contents of the respective components in the pigment water dispersion of the present invention are as follows from the viewpoint of improving dispersion stability, substrate-adhesion properties, rub fastness, etc., of the resulting pigment water dispersion or water-based ink.

Content of Pigment

The content of the pigment in the pigment water dispersion is preferably not less than 2% by mass, more preferably not less than 4% by mass, and even more preferably not less than 6% by mass, and is also preferably not more than 20% by mass, more preferably not more than 18% by mass, and even more preferably not more than 15% by mass.

The content of the pigment-containing resin particles in the pigment water dispersion is preferably not less than 3% by mass, more preferably not less than 6% by mass, and even more preferably not less than 10% by mass, and is also preferably not more than 35% by mass, more preferably not more than 30% by mass, and even more preferably not more than 25% by mass.

The content of the polyester resin in the pigment water dispersion is preferably not less than 1% by mass, more preferably not less than 2% by mass, and even more preferably not less than 3% by mass, and is also preferably not more than 15% by mass, more preferably not more than 12% by mass, and even more preferably not more than 10% by mass.

The mass ratio of the pigment to the pigment-containing resin particles (pigment/pigment-containing resin particles) in the pigment water dispersion is preferably not less than 0.2, more preferably not less than 0.3, and even more preferably not less than 0.4, and is also preferably not more than 0.9, more preferably not more than 0.8, and even more preferably not more than 0.7, from the viewpoint of improving dispersion stability of the pigment water dispersion as well as from the viewpoint of facilitating production of the ink.

The aforementioned mass ratio (pigment/pigment-containing resin particles) may be calculated from the ratio between the amounts of the respective components charged.

Water-Based Ink

The water-based ink for ink-jet printing according to the present invention contains the pigment water dispersion of the present invention, and a water-soluble organic solvent.

The term "water-based" as used herein means that water has a largest content among components of a medium contained in the ink.

The water-based ink of the present invention may be efficiently produced by mixing the above-obtained pigment water dispersion containing the pigment-containing resin particles, the water-soluble organic solvent, and water, and further, if required, various additives, such as a surfactant, etc. The method of mixing the respective components as described above is not particularly limited.

Water-Soluble Organic Solvent

The water-soluble organic solvent used in the water-based ink may be in the form of either a liquid or a solid as measured at 25° C. However, the water-soluble organic solvent is preferably such a solvent that when dissolving the organic solvent in 100 mL of water at 25° C., the amount of the organic solvent dissolved in the water is not less than 10 mL.

The boiling point of the water-soluble organic solvent is not lower than 100° C., preferably not lower than 120° C., more preferably not lower than 140° C., and even more preferably not lower than 150° C., and is also not higher than 250° C., preferably not higher than 245° C., more preferably not higher than 240° ° C., and even more preferably not higher than 235° C., from the viewpoint of improving wet-spreadability of the resulting ink.

Examples of the water-soluble organic solvent include glycol ethers, such as alkylene glycol ethers, etc., polyhydric alcohols, such as ethylene glycol, propylene glycol, glycerin, etc., amide compounds, and the like. Of these water-soluble organic solvents, preferred are alkylene glycol ethers.

Examples of the alkylene glycol ethers include ethylene glycol monomethyl ether, ethylene glycol monoethyl ether, ethylene glycol monoisopropyl ether, ethylene glycol mono(iso)butyl ether, diethylene glycol monomethyl ether, diethylene glycol monoethyl ether, diethylene glycol mono(iso)propyl ether, diethylene glycol mono(iso)butyl ether, triethylene glycol monoisobutyl ether, tetraethylene glycol monomethyl ether, propylene glycol monoethyl ether, dipropylene glycol monobutyl ether, dipropylene glycol monomethyl ether, and the like.

Of these alkylene glycol ethers, from the viewpoint of improving wet-spreadability of the resulting ink as well as from the viewpoint of improving substrate-adhesion properties and rub fastness of the resulting printed material, preferred is at least one compound selected from the group consisting of diethylene glycol monoisobutyl ether, diethylene glycol monobutyl ether, ethylene glycol monomethyl ether, ethylene glycol isobutyl ether, diethylene glycol monomethyl ether, and dipropylene glycol monomethyl ether, and more preferred is dipropylene glycol monoisobutyl ether.

In the present invention, it is preferred that the water-based ink contains propylene glycol in addition to the alkylene glycol ether.

It is considered that the propylene glycol has the function capable of suppressing evaporation of water mainly from ink nozzles but rapidly volatilizing water after the printing operation to enable formation of a firm coating film of the ink by conducting merely a minimum drying step, and thereby inhibiting a printed surface of the respective printed materials from adhering to a rear-side surface thereof.

Surfactant

The ink of the present invention preferably contains a surfactant from the viewpoint of maintaining an adequate surface tension of the ink and improving wettability of the ink to a printing medium.

The surfactant is not particularly limited, and is preferably a nonionic surfactant, and more preferably a silicone-based surfactant.

Examples of the silicone-based surfactant include dimethyl polysiloxane, a polyether-modified silicone, an amino-modified silicone, a carboxy-modified silicone, and the like. Of these silicone-based surfactants, from the same viewpoint as described above, preferred is a polyether-modified silicone.

Specific examples of the polyether-modified silicone include PEG-3 dimethicone, PEG-9 dimethicone, PEG-9 methyl ether dimethicone, PEG-10 dimethicone, PEG-11 methyl ether dimethicone, PEG/PPG-20/22 butyl ether dimethicone, PEG-32 methyl ether dimethicone, PEG-9 polydimethylsiloxyethyl dimethicone, lauryl PEG-9 polydimethylsiloxyethyl dimethicone, and the like.

Specific examples of commercially available products of the polyether-modified silicone include silicones available from Shin-Etsu Chemical Co., Ltd., such as "KF-6011", "KF-6012", "KF-6013", KF-6015", "KF-6016", "KF-6017", "KF-6028", "KF-6038", "KF-6043", etc.

In the present invention, it is also preferred that an acetylene glycol-based surfactant is used in the ink in addition to the silicone-based surfactant.

Examples of commercially available products of the acetylene glycol-based surfactant include "SURFYNOL" series products and "OLFINE" series products both available from Nissin Chemical Co., Ltd., and "ACETYLENOL" series products available from Kawaken Fine Chemicals Co., Ltd., and the like.

The aforementioned surfactants may be used alone or in combination of any two or more thereof.

Examples of the other additives that may be used in the water-based ink of the present invention include a fixing aid, a humectant, a wetting agent, a penetrant, a viscosity controller, a defoaming agent, an antiseptic agent, a mildewproof agent, a rust preventive, and the like.

Examples of the fixing aid include emulsions containing water-insoluble polymer particles. Examples of the water-insoluble polymer particles include particles of condensation-based resins, such as polyurethanes, polyesters, etc.; and vinyl-based resins, such as (meth)acrylic resins, styrene-based resins, styrene-(meth)acrylic resins, butadiene-based resins, styrene-butadiene-based resins, vinyl chloride-based resins, vinyl acetate-based resins, acrylic-silicone-based resins, etc.

The term "water-insoluble" of the water-insoluble polymer particles as used herein means that when the water-insoluble polymer particles are dried to a constant weight at 105° C. for 2 hours and then dissolved in 100 g of water at 25° C., the solubility in water of the water-insoluble polymer particles is not more than 10 g. The solubility in water of the water-insoluble polymer particles is preferably not more than 5 g, and more preferably not more than 1 g. In the case where the water-insoluble polymer particles is formed of an anionic polymer, the aforementioned solubility means a solubility in water of the anionic polymer whose anionic groups are neutralized completely (i.e., 100%) with sodium hydroxide.

Contents of Respective Components in Water-Based Ink of the Present Invention

The contents of the respective components in the water-based ink of the present invention are as follows from the viewpoint of improving long-term dispersion stability of the water-based ink, and providing a printed material that is excellent in substrate-adhesion properties, rub fastness, and solvent resistance.

Content of Pigment

The content of the pigment in the water-based ink is preferably not less than 1% by mass, more preferably not less than 2% by mass, and even more preferably not less than 2.5% by mass, and is also preferably not more than 15% by mass, more preferably not more than 10% by mass, and even more preferably not more than 8% by mass.

The content of the pigment-containing resin particles in the water-based ink is preferably not less than 2% by mass, more preferably not less than 3% by mass, and even more preferably not less than 5% by mass, and is also preferably not more than 30% by mass, more preferably not more than 20% by mass, and even more preferably not more than 15% by mass.

The content of the polyester resin in the water-based ink is preferably not less than 1% by mass, more preferably not less than 1.5% by mass, and even more preferably not less than 2% by mass, and is also preferably not more than 12% by mass, more preferably not more than 10% by mass, and even more preferably not more than 6% by mass.

The mass ratio of the pigment to the pigment-containing resin particles (pigment/pigment-containing resin particles) in the water-based ink is preferably not less than 0.2, more preferably not less than 0.3, and even more preferably not less than 0.4, and is also preferably not more than 0.9, more preferably not more than 0.8, and even more preferably not more than 0.7.

The total content of the organic solvents in the water-based ink is preferably not less than 10% by mass, more preferably not less than 20% by mass, and even more preferably not less than 30% by mass, and is also preferably not more than 45% by mass, more preferably not more than 42% by mass, and even more preferably not more than 40% by mass.

The content of the surfactant in the water-based ink is preferably not less than 0.1% by mass, more preferably not less than 0.2% by mass, and even more preferably not less than 0.3% by mass, and is also preferably not more than 3% by mass, more preferably not more than 2% by mass, and even more preferably not more than 1% by mass.

The content of water in the water-based ink is preferably not less than 50% by mass, more preferably not less than 54% by mass, and even more preferably not less than 58% by mass, and is also preferably not more than 85% by mass, more preferably not more than 80% by mass, and even more preferably not more than 75% by mass.

Properties of Water-Based Ink of the Present Invention

The viscosity of the water-based ink as measured at 32° C. is preferably not less than 2 mPa·s and more preferably not less than 2.5 mPa·s, and is also preferably not more than 12 mPa·s, more preferably not more than 9 mPa·s and even more preferably not more than 7 mPa·s, from the viewpoint of improving long-term dispersion stability, substrate-adhesion properties, rub fastness, etc., of the water-based ink.

The pH value of the water-based ink is preferably not less than 7.0, more preferably not less than 7.2, and even more preferably not less than 7.3, and is also preferably not more than 11, more preferably not more than 10, and even more preferably 9, from the viewpoint of improving storage stability of the water-based ink, reducing corrosiveness of the water-based ink, etc.

The water-based ink of the present invention is excellent in filterability after long-term storage, and is capable of providing a printed material that is excellent in substrate-adhesion properties, rub fastness, and solvent resistance. Therefore, the water-based ink of the present invention is preferably used for ink-jet printing.

The water-based ink of the present invention may be loaded into a conventionally known ink-jet printing apparatus of a piezoelectric type, etc., and ejected therefrom in the form of droplets of the ink onto a low-liquid absorbing printing medium, etc., whereby it is possible to obtain printed images, etc., thereon.

Examples of the low-liquid absorbing printing medium include a low-liquid absorbing coated paper or art paper, and a non-liquid absorbing resin film.

Examples of the coated paper include a versatile glossy coated paper, a multi-color foam glossy coated paper, etc.

As the resin film, there may be mentioned a transparent synthetic resin film. Examples of the transparent synthetic resin film include a polyester film, a polyvinyl chloride film, a polyolefin film, a nylon film, and the like. These films may be used in the form of any of a biaxially oriented film, a monoaxially oriented film, and a non-oriented film. Among these films, preferred are a polyester film and an oriented polypropylene film, and more preferred are a polyethylene terephthalate (PET) film subjected to corona discharge treatment, a biaxially oriented polypropylene (OPP) film subjected to corona discharge treatment, and the like.

EXAMPLES

In the following Production Examples, Examples and Comparative Examples, various properties, etc., were measured by the following methods.

(1) Acid Value of Polyester Resin

The acid value of the resin was measured by the same neutralization titration method as prescribed in JIS K 0070: 1992 except that only a mixed solvent of ethanol and ether used as a measuring solvent in the method was replaced with a mixed solvent containing acetone and toluene at a volume ratio [acetone:toluene] of 1:1.

(2) Softening Point of Polyester Resin

Using a flow tester "CFT-500D" (tradename) available from Shimadzu Corporation, 1 g of a sample to be measured was extruded through a nozzle having a die pore diameter of 1 mm and a length of 1 mm while heating the sample at a temperature rise rate of 6° C./minute and applying a load of 1.96 MPa thereto by a plunger. The softening point of the resin as the sample to be measured was determined as the temperature at which a half amount of the sample was flowed out when plotting a downward movement of the plunger of the flow tester relative to the temperature.

(3) Glass Transition Temperature (Tg) of Polyester Resin

Using a differential scanning calorimeter "Pyris 6 DSC" (tradename) commercially available from PerkinElmer Co., Ltd., a sample to be measured was heated to 200° C. and then cooled from 200° C. to 0° C. at a temperature drop rate of 10° C./minute, and thereafter heated again at a temperature rise rate of 10° C./minute to prepare an endothermic characteristic curve thereof. The temperature at which an extension of a baseline below an endothermic maximum peak temperature appearing on the curve was intersected with a tangential line having a maximum inclination of the curve in the range of from a rise-up portion to an apex of the peak was read as a glass transition temperature (Tg) of the resin as the sample to be measured.

(4) Weight-Average Molecular Weight (Mw) of Polyester Resin

A polyester resin as a sample to be measured was dissolved in chloroform to prepare a solution of the polyester resin having a concentration of 0.5 g/100 mL, and the resulting solution was subjected to filtration treatment by passing the solution through a fluororesin filter "FP-200" (tradename) having a pore size of 2 μm available from Sumitomo Electric Industries, Ltd., to remove insoluble components therefrom, thereby preparing a sample solution.

Tetrahydrofuran as an eluent for measurement of a molecular weight of the sample was allowed to flow through analytical columns at a flow rate of 1 mL/minute to stabilize the columns in a thermostatic oven at 40° C., and then 100 μL of the aforementioned sample solution was injected into the columns to measure a weight-average molecular weight of the sample.

The weight-average molecular weight of the sample was measured by gel chromatography [GPC apparatus: "CO-8010" and analytical columns: "GMHXL"+"G3000HXL" all available from Tosoh Corporation] and calculated on the basis of a calibration curve previously prepared. The calibration curve was prepared by using the following several kinds of monodisperse polystyrenes (monodisperse polystyrenes having weight-average molecular weights (Mw) of $2.63 \times 10^3$, $2.06 \times 10^4$, and $1.02 \times 10^5$ all available from Tosoh Corporation as well as monodisperse polystyrenes having weight-average molecular weights (Mw) of $2.10 \times 10^3$, $7.00 \times 10^3$, and $5.04 \times 10^4$ all available from GL Sciences Inc.) as reference standard samples.

(5) Average Particle Size of Pigment Water Dispersion

Using a laser particle analyzing system "ELS-8000" (tradename) available from Otsuka Electrics Co., Ltd., an average particle size of particles in the pigment water dispersion was measured by a dynamic light-scattering method and calculated by cumulant analysis. The measurement was conducted under the conditions including a temperature of 25° C., an angle between incident light and detector of 90° and a cumulative number of 100 times, and a refractive index of water (1.333) was input to the analyzing system as a refractive index of the dispersing solvent. As the sample to measured, there was used a dispersion prepared by weighing the pigment water dispersion in a screw vial No. 5 available from Maruemu Corporation, adding water to the dispersion such that a solid content of the dispersion was adjusted to $2 \times 10^{-4}$% by mass, and stirring the resulting mixture with a magnetic stirrer at 25° C. for 1 hour.

(6) Solid Content

Sodium sulfate dried to a constant weight in a desiccator was weighed in an amount of 10.0 g and charged into a 30 mL polypropylene container (φ: 40 mm; height: 30 mm), and 1.0 g of a sample to be measured was added to the container. The contents of the container were mixed and then accurately weighed. The resulting mixture was maintained in the container at 105° C. for 2 hours to remove volatile components therefrom, and further allowed to stand in a desiccator for 15 minutes, followed by measuring a mass thereof. The mass of the sample after removing the volatile components therefrom was regarded as a mass of solids in the sample. The solid content of the sample was calculated by dividing the mass of the solids by the mass of the sample initially added.

(7) pH

The pH value of each of the pigment water dispersion and the ink was measured at 20° C. using a bench-top PH meter "F-71" (tradename) available from Horiba Ltd., equipped with a pH electrode "6337-10D" (tradename) available from Horiba Ltd.

Production Examples 1 to 7 and Comparative Production Example 1

Production of Polyester Resins P1 to P7 and CP1

A 10 L-capacity four-necked flask equipped with a nitrogen inlet tube, a stirrer, and a thermocouple was charged with the respective raw material monomers other than trimellitic anhydride, and an esterification catalyst, as shown in Table 1. The contents of the flask were heated to 235° C. in a nitrogen atmosphere, and then subjected to polycondensation reaction at 235° C. for 6 hours. Next, the contents of the flask were cooled to 210° C., and then the trimellitic anhydride shown in Table 1 was added to the flask, followed by allowing the contents of the flask to react with each other at 210° C. for 1 hour. Then, the contents of the flask were continuously allowed to react with each other at 210° C. under a reduced pressure of 10 kPa until a softening point of the resulting polymer reached the temperature shown in Table 1, thereby obtaining polyester resins P1 to P7 and CP1. The results are shown in Table 1.

TABLE 1

| | | | Production Examples | | | | | | | | | | | | | |
|---|---|---|---|---|---|---|---|---|---|---|---|---|---|---|---|---|
| | | | 1 | | 2 | | 3 | | 4 | | 5 | | 6 | | 7 | Com. Prod. Ex. 1 |
| | | | \multicolumn{14}{c}{Kind of polyester resin} | |
| | | | P1 | | P2 | | P3 | | P4 | | P5 | | P6 | | P7 | CP1 |
| | | | \multicolumn{14}{c}{Amounts of respective components charged*1} | |
| | | | g | mol % | g | mol % | g | mol % | g | mol % | g | mol % | g | mol % | g | mol % | g | mol % |
| Composition of monomers | Alcohol component | 3-Methyl-1,5-pentanediol | 295 | 10 | 590 | 20 | 1180 | 40 | 1475 | 50 | 1770 | 60 | 2065 | 70 | 2360 | 80 | | |
| | | BPA-PO*2 | 7875 | 90 | 7000 | 80 | 5250 | 60 | 4375 | 50 | 3500 | 40 | 2625 | 30 | 1750 | 20 | 8750 | 100 |
| | Carboxylic acid | Terephthalic acid | 3735 | 90 | 3735 | 90 | 3735 | 90 | 3735 | 90 | 3735 | 90 | 3735 | 90 | 3735 | 90 | 3735 | 90 |
| | | Trimellitic anhydride | 288 | 6 | 288 | 6 | 288 | 6 | 288 | 6 | 288 | 6 | 288 | 6 | 288 | 6 | 288 | 6 |
| Catalyst: Tin (II) di(2-ethyl hexanoate) | | | 50 | | 50 | | 50 | | 50 | | 50 | | 50 | | 50 | | 40 | |
| Acid value (mgKOH/g) | | | | 35 | | 23 | | 24 | | 29 | | 30 | | 27 | | 17 | | 17 |
| Softening point (° C.) | | | | 129 | | 125 | | 120 | | 116 | | 115 | | 104 | | 98 | | 128 |
| Glass transition temperature (° C.) | | | | 73 | | 69 | | 66 | | 58 | | 50 | | 45 | | 39 | | 78 |
| Weight-average molecular weight | | | | 13600 | | 18400 | | 17300 | | 13400 | | 14300 | | 15800 | | 20300 | | 21000 |

Note
*1 Molar number on the basis of 100 moles of a whole amount of the alcohol component
*2 Propyleneoxide (2.2) adduct of 2,2-bis[4-hydroxyphenyl]propane Production Examples 8 to 14 and 18 (Production of Polyester Resins P8 to P14 and P18)

A 10 L-capacity four-necked flask equipped with a thermometer, a fractionating column, a stainless steel stirring rod, a flow-down type condenser with a dehydration tube, and a nitrogen inlet tube was charged with the respective raw material monomers other than trimellitic anhydride, and an esterification catalyst, as shown in Table 2. The contents of the flask were heated to 185° C. within a mantle heater in a nitrogen atmosphere to conduct the reaction therebetween for 5 hours, and then heated stepwise to 220° C. at a rate of 5° C./hour, followed by further reducing an inside pressure of the flask to 8.3 kPa at which the contents of the flask were maintained for 1 hour. Thereafter, the contents of the flask were cooled to 200° C., and after the pressure within the flask was returned to atmospheric pressure, trimellitic anhydride was added to the flask. The contents of the flask were heated to 220° C. and maintained at 220° C. for 1 hour, and then the inside pressure of the flask was further reduced to allow the contents of the flask to react with each other until a softening point of the resulting polymer as measured under a pressure of 8.3 kPa reached the temperature shown in Table 2, thereby obtaining polyester resins P8 to P14 and P18. The results are shown in Table 2.

Production Examples 15, 16 and 17 (Production of Polyester Resins P15, P16 and P17)

A 10 L-capacity four-necked flask equipped with a thermometer, a fractionating column, a stainless steel stirring rod, a flow-down type condenser with a dehydration tube, and a nitrogen inlet tube was charged with the respective raw material monomers other than trimellitic anhydride, and an esterification catalyst, as shown in Table 2. The contents of the flask were heated to 185° C. within a mantle heater in a nitrogen atmosphere to conduct the reaction therebetween for 5 hours, and then heated stepwise to 235° C. at a rate of 5° C./hour, followed by further reducing an inside pressure of the flask to 8.3 kPa at which the contents of the flask were maintained for 1 hour. Thereafter, the contents of the flask were cooled to 200° C., and after the pressure within the flask was returned to atmospheric pressure, trimellitic anhydride was added to the flask. The contents of the flask were heated to 220° C. and maintained at 220° C. for 1 hour, and then the inside pressure of the flask was further reduced to allow the contents of the flask to react with each other until a softening point of the resulting polymer as measured under a pressure of 8.3 kPa reached the temperature shown in Table 2, thereby obtaining polyester resins P15, P16 and P17. The results are shown in Table 2.

TABLE 2

| | | | Production Examples | | | | | | | | | | | |
|---|---|---|---|---|---|---|---|---|---|---|---|---|---|---|
| | | | 8 | | 9 | | 10 | | 11 | | 12 | | 13 | |
| | | | \multicolumn{12}{c}{Kind of polyester resin} |
| | | | P8 | | P9 | | P10 | | P11 | | P12 | | P13 | |
| | | | \multicolumn{12}{c}{Amounts of respective components charged*1} |
| | | | g | mol % | g | mol % | g | mol % | g | mol % | g | mol % | g | mol % |
| Composition of monomers | Alcohol component | 3-Methyl-1,5-pentanediol HBPA*2 | 295 | 10 | 590 | 20 | 1180 | 40 | 1475 | 50 | 1770 | 60 | 2065 | 70 |

TABLE 2-continued

|  |  |  |  |  |  |  |  |  |  |  |  |  |  |
|---|---|---|---|---|---|---|---|---|---|---|---|---|---|
|  |  | 2,3-Butanediol 1,2-Propanediol | 2025 | 90 | 1800 | 80 | 1350 | 60 | 1125 | 50 | 900 | 40 | 675 | 30 |
|  | Carboxylic acid | Terephthalic acid | 3735 | 90 | 3735 | 90 | 3735 | 90 | 3735 | 90 | 3735 | 90 | 3735 | 90 |
|  |  | Trimellitic anhydride | 288 | 6 | 288 | 6 | 288 | 6 | 288 | 6 | 288 | 6 | 288 | 6 |
| Catalyst: Tin (II) di(2-ethyl hexanoate) |  |  | 50 |  | 50 |  | 50 |  | 50 |  | 50 |  | 50 |  |
| Properties of polyester resin | Acid value (mgKOH/g) |  | 17 |  | 19 |  | 23 |  | 27 |  | 28 |  | 27 |  |
|  | Softening point (° C.) |  | 142 |  | 134 |  | 126 |  | 122 |  | 119 |  | 108 |  |
|  | Glass transition temperature (° C.) |  | 81 |  | 79 |  | 74 |  | 71 |  | 66 |  | 59 |  |
|  | Weight-average molecular weight |  | 22800 |  | 17300 |  | 16500 |  | 15800 |  | 13400 |  | 14200 |  |

| | | | Production Examples | | | | | | | | |
|---|---|---|---|---|---|---|---|---|---|---|---|
| | | | 14 | | 15 | | 16 | | 17 | | 18 |
| | | | Kind of polyester resin | | | | | | | | |
| | | | P14 | | P15 | | P16 | | P17 | | P18 |
| | | | Amounts of respective components charged[*1] | | | | | | | | |
| | | | g | mol % | g | mol % | g | mol % | g | mol % | g | mol % |
| Composition of monomers | Alcohol component | 3-Methyl-1,5-pentanediol | 2360 | 80 | 2065 | 70 | 1770 | 60 | 1475 | 50 | 1770 | 60 |
| | | HBPA[*2] | | | 1800 | 30 | 2400 | 40 | 3000 | 50 | | |
| | | 2,3-Butanediol | 450 | 20 | | | | | | | | |
| | | 1,2-Propanediol | | | | | | | | | 760 | 40 |
| | Carboxylic acid | Terephthalic acid | 3735 | 90 | 3735 | 90 | 3320 | 80 | 3320 | 80 | 3528 | 85 |
| | | Trimellitic anhydride | 288 | 6 | 288 | 6 | 192 | 4 | 192 | 4 | 288 | 6 |
| Catalyst: Tin (II) di(2-ethyl hexanoate) | | | 50 | | 40 | | 30 | | 30 | | 40 | |
| Properties of polyester resin | Acid value (mgKOH/g) | | 23 | | 18 | | 15 | | 20 | | 20 | |
| | Softening point (° C.) | | 91 | | 107 | | 140 | | 142 | | 112 | |
| | Glass transition temperature (° C.) | | 40 | | 48 | | 78 | | 92 | | 60 | |
| | Weight-average molecular weight | | 16400 | | 21500 | | 66000 | | 20400 | | 19800 | |

Note
[*1]Molar number on the basis of 100 moles of a whole amount of the alcohol component
[*2]Hydrogenated bisphenol A Example 1 (Preparation of Pigment Water Dispersion 1 of Pigment-Containing Resin Particles)

(1) Step 1 (Pigment Dispersing Step 1)

In a 2 L-capacity container, 66.7 parts of the polyester resin P1 obtained in Production Example 1 were dissolved in 198.6 parts of MEK, and a 5N sodium hydroxide aqueous solution was added to the resulting polymer solution such that 85 mol % of an acid value of the polyester resin P1 was neutralized. Then, 390.5 parts of ion-exchanged water were further added dropwise to the polymer solution over 30 minutes, and the resulting mixed solution was stirred and mixed in a temperature range of from 10 to 15° C. using a disper blade operated at 1,500 r/min for 15 minutes.

Successively, 100 parts of carbon black "MONARCH 717" available from Cabot Corporation were added to the obtained reaction solution, and the resulting mixture was stirred and mixed in a temperature range of from 10 to 15° C. using a disper blade operated at 6,500 r/min for 2 hours to thereby obtain a preliminary dispersion.

The thus obtained preliminary dispersion was subjected to filtration treatment through a 200-mesh filter, and then diluted by adding 36.1 parts of ion-exchanged water thereto. Thereafter, the resulting diluted dispersion was subjected to dispersion treatment under a pressure of 150 MPa using a Microfluidizer "M-110EH-30XP" (tradename) (high-pressure homogenizer) available from Microfluidics Corporation by passing the dispersion through the device 15 times, thereby obtaining a water dispersion liquid of pigment-containing resin particles.

(2) Step 2 (Concentration Step)

A 2 L eggplant-shaped flask was charged with the whole amount of the pigment water dispersion liquid obtained in the step 1, and then ion-exchanged water was added thereto such that a solid content of the dispersion liquid was adjusted to 15%. The resulting dispersion was maintained under a pressure of 0.09 MPa (abs) in a warm water bath adjusted to 32° C. for 3 hours using a rotary distillation apparatus "Rotary Evaporator N-1000S" (tradename) available from Tokyo Rikakikai Co., Ltd., operated at a rotating speed of 50 r/min to remove the organic solvent therefrom. Furthermore, the temperature of the warm water bath was adjusted to 62° C., and the pressure in the apparatus was reduced to 0.07 MPa (abs), and the resulting reaction solution was concentrated under this condition until a solid content of the reaction solution became 25%, thereby obtaining a concentrated solution.

The thus obtained concentrated solution was charged into a 500 mL angle rotor, and subjected to centrifugal separation using a high-speed cooling centrifuge "himac CR22G"

(tradename; temperature set: 20° C.) available from Hitachi Koki Co., Ltd., at 3,660 r/min for 20 minutes. Thereafter, the liquid layer portion thus separated was subjected to filtration treatment through a membrane filter "Minisart" (tradename) having a pore size of 5 μm available from Sartorius Inc., and then the resulting filtered product was diluted with water such that a solid content thereof was adjusted to 22%, thereby obtaining a pigment water dispersion 1 of the pigment-containing resin particles (solid content: 22%; pigment content: 13.2%; polyester resin content: 8.8%).

Examples 2 to 52 and Comparative Examples 1 and 2 (Preparation of Pigment Water Dispersions of Pigment-Containing Resin Particles)

The same procedure as in Example 1 was repeated except that the conditions were changed to those shown in Tables 3 and 4, thereby obtaining pigment water dispersions 2 to 52 and comparative water dispersions 1 and 2 of the pigment-containing polyester resin particles.

The thus obtained pigment water dispersions 1 to 52 and comparative water dispersions 1 and 2 were evaluated with respect to dispersion stability and re-dispersibility after long-term storage by the following methods. The results are shown in Tables 3 and 4.

Dispersion Stability

The pigment water dispersion was diluted with ion-exchanged water within one day after production thereof such that a solid content of the dispersion was reduced to 0.25%, and weighed in a screw vial "Model No. 5" available from Maruemu Corporation, and the resulting diluted dispersion was stirred with a magnetic stirrer at 25° C. for 1 hour to thereby obtain a pigment water dispersion (α). The thus obtained pigment water dispersion (α) was injected into a dynamic light scattering particle size distribution measuring apparatus "AccuSizer 780APS" (tradename) available from Nihon Entegris G.K., using a 5 mL syringe to count the number of particles in the dispersion at a measuring temperature of 25° C. by a particle number counting method.

The particle sizes measured in the particle number counting method were in the range of from 0.51 μm to 483.42 μm.

The number of coarse particles in the pigment water dispersion was calculated in terms of the number of particles having a particle size of not less than 0.5 μm per 1 mL of the pigment water dispersion having a solid content of 20%.

Successively, the pigment water dispersion that had been allowed to stand at room temperature for 6 months was diluted with ion-exchanged water in the same manner as described above to thereby obtain a pigment water dispersion (β). The number of the particles in the thus obtained pigment water dispersion (β) was measured by the same method as described above.

The rate (%) of increase in number of the particles was calculated according to the following formula.

Rate (%) of increase in number of particles=[[number of particles having a particle size of not less than 0.5 μm per 1 mL of pigment water dispersion (β) having solid content of 20%]/[number of particles having a particle size of not less than 0.5 μm per 1 mL of pigment water dispersion (α) having solid content of 20%]−1]×100

Evaluation Ratings

5: The rate of increase in number of the particles was less than 5%.
4: The rate of increase in number of the particles was not less than 5% and less than 10%.
3: The rate of increase in number of the particles was not less than 10% and less than 100%.
2: The rate of increase in number of the particles was not less than 100% and less than 1000%.
1: The rate of increase in number of the particles was not less than 1000%.

The smaller the rate of increase in number of the particles became, the more excellent the storage stability of the pigment water dispersion was. If the evaluation result was the rank 3, 4 or 5, the pigment water dispersion was sufficient in dispersion stability, and the amount of the coarse particles in the pigment water dispersion would cause no significant problem upon practical use.

Evaluation of Re-Dispersibility after Long-Term Storage

Forty grams (40 g) of the respective pigment water dispersions obtained in the aforementioned Examples and Comparative Examples as shown in Tables 3 and 4 were charged into a 50 mL sealable glass screw vial, and allowed to stand therein while maintaining the screw vial in a hermetically sealed upright state at room temperature for 6 months. Thereafter, the screw vial was laid down horizontally, and rotated around a center axis thereof as a rotation axis at 100 rpm for 1 hour to redisperse the respective pigment water dispersions.

The solid content of the respective pigment water dispersions after being redispersed was measured to calculate the percentage of the solid content thus measured after being redispersed on the basis of a solid content thereof before the long-term standing, and thereby evaluate re-dispersibility of the respective pigment water dispersions.

Evaluation Ratings

5: The percentage of the solid content after being redispersed was not less than 99%.
4: The percentage of the solid content after being redispersed was not less than 97% and less than 99%.
3: The percentage of the solid content after being redispersed was not less than 95% and less than 97%.
2: The percentage of the solid content after being redispersed was not less than 93% and less than 95%.
1: The percentage of the solid content after being redispersed was less than 93%.

If the evaluation result was the rank 3, 4 or 5, the re-dispersibility of the pigment water dispersion was in an acceptable level.

TABLE 3

| | | | Polyester Resin | Pigment | Average particle size (nm) | pH | Dispersion stability | Redispersibility after long-term storage |
|---|---|---|---|---|---|---|---|---|
| Examples | 1 | Water dispersion 1 | Polyester resin P1 | Carbon black ("MONARCH 717" available from Cabot Corporation) | 97 | 7.8 | 3 | 4 |

TABLE 3-continued

| | | Polyester Resin | Pigment | Average particle size (nm) | pH | Dispersion stability | Redispersibility after long-term storage |
|---|---|---|---|---|---|---|---|
| 2 | Water dispersion 2 | Polyester resin P2 | Carbon black ("MONARCH 717" available from Cabot Corporation) | 95 | 7.5 | 4 | 5 |
| 3 | Water dispersion 3 | Polyester resin P3 | Carbon black ("MONARCH 717" available from Cabot Corporation) | 93 | 7.4 | 4 | 5 |
| 4 | Water dispersion 4 | Polyester resin P4 | Carbon black ("MONARCH 717" available from Cabot Corporation) | 96 | 7.7 | 4 | 5 |
| 5 | Water dispersion 5 | Polyester resin P5 | Carbon black ("MONARCH 717" available from Cabot Corporation) | 92 | 7.3 | 5 | 5 |
| 6 | Water dispersion 6 | Polyester resin P6 | Carbon black ("MONARCH 717" available from Cabot Corporation) | 95 | 7.9 | 4 | 5 |
| 7 | Water dispersion 7 | Polyester resin P7 | Carbon black ("MONARCH 717" available from Cabot Corporation) | 97 | 7.6 | 3 | 4 |
| 8 | Water dispersion 8 | Polyester resin P5 | Carbon black ("MONARCH 717" available from Cabot Corporation) | 90 | 7.4 | 5 | 5 |
| 9 | Water dispersion 9 | Polyester resin P5 | C.I. Pigment Blue 15:3 ("CFB6338JC" available from Dainichiseika Color & Chemicals Mfg. Co., Ltd.) | 98 | 7.5 | 5 | 5 |
| 10 | Water dispersion 10 | Polyester resin P5 | C.I. Pigment Red 150 ("FFC 522-1D" available from Fuji Pigment Co., Ltd.) | 153 | 7.8 | 5 | 5 |
| 11 | Water dispersion 11 | Polyester resin P5 | C.I. Pigment Yellow 155 ("IJY4GC" available from Clariant AG) | 152 | 7.6 | 5 | 5 |
| 12 | Water dispersion 12 | Polyester resin P5 | C.I. Pigment Red 122 ("CFR6111T" available from Dainichiseika Color & Chemicals Mfg. Co., Ltd.) | 101 | 7.5 | 5 | 5 |
| 13 | Water dispersion 13 | Polyester resin P8 | Carbon black ("MONARCH 717" available from Cabot Corporation) | 99 | 7.5 | 3 | 4 |
| 14 | Water dispersion 14 | Polyester resin P9 | Carbon black ("MONARCH 717" available from Cabot Corporation) | 94 | 7.6 | 4 | 5 |
| 15 | Water dispersion 15 | Polyester resin P10 | Carbon black ("MONARCH 717" available from Cabot Corporation) | 95 | 7.5 | 4 | 5 |
| 16 | Water dispersion 16 | Polyester resin P11 | Carbon black ("MONARCH 717" available from Cabot Corporation) | 92 | 7.7 | 4 | 5 |
| 17 | Water dispersion 17 | Polyester resin P12 | Carbon black ("MONARCH 717" available from Cabot Corporation) | 91 | 7.4 | 5 | 5 |
| 18 | Water dispersion 18 | Polyester resin P13 | Carbon black ("MONARCH 717" available from Cabot Corporation) | 96 | 7.5 | 4 | 5 |
| 19 | Water dispersion 19 | Polyester resin P14 | Carbon black ("MONARCH 717" available from Cabot Corporation) | 100 | 7.4 | 3 | 4 |
| 20 | Water dispersion 20 | Polyester resin P12 | Carbon black ("MONARCH 800" available from Cabot Corporation) | 89 | 7.5 | 5 | 5 |
| 21 | Water dispersion 21 | Polyester resin P12 | C.I. Pigment Blue 15:3 ("CFB6338JC" available from Dainichiseika Color & Chemicals Mfg. Co., Ltd.) | 99 | 7.6 | 5 | 5 |
| 22 | Water dispersion 22 | Polyester resin P12 | C.I. Pigment Red 150 ("FFC 522-1D" available from Fuji Pigment Co., Ltd.) | 157 | 7.5 | 5 | 5 |
| 23 | Water dispersion 23 | Polyester resin P12 | C.I. PigmentYellow 155 ("IJY4GC" available from Clariant AG) | 151 | 7.6 | 5 | 5 |
| 24 | Water dispersion 24 | Polyester resin P12 | C.I. Pigment Red 122 ("CFR6111T" available from Dainichiseika Color & Chemicals Mfg. Co., Ltd.) | 105 | 7.6 | 5 | 5 |

TABLE 3-continued

|  |  | Polyester Resin | Pigment | Average particle size (nm) | pH | Dispersion stability | Redispersibility after long-term storage |
|---|---|---|---|---|---|---|---|
|  | 25 | Water dispersion 25 | Polyester resin P15 | Carbon black ("MONARCH 717" available from Cabot Corporation) | 102 | 7.5 | 3 | 4 |
|  | 26 | Water dispersion 26 | Polyester resin P16 | Carbon black ("MONARCH 717" available from Cabot Corporation) | 97 | 7.5 | 5 | 5 |
|  | 27 | Water dispersion 27 | Polyester resin P17 | Carbon black ("MONARCH 717" available from Cabot Corporation) | 101 | 7.5 | 3 | 4 |
|  | 28 | Water dispersion 28 | Polyester resin P18 | Carbon black ("MONARCH 717" available from Cabot Corporation) | 103 | 7.5 | 3 | 4 |
| Comparative Example 1 |  | Comparative water dispersion 1 | Polyester resin CP1 | Carbon black ("MONARCH 717" available from Cabot Corporation) | 105 | 7.4 | 2 | 3 |

TABLE 4

|  |  |  | Polyester Resin | Pigment | Average particle size (nm) | pH | Dispersion stability | Redispersibility after long-term storage |
|---|---|---|---|---|---|---|---|---|
| Examples | 29 | Water dispersion 29 | Polyester resin P1 | Surface OTS-treated titanium oxide ("CR50" available from DAITO KASEI KOGYO CO., LTD.) | 325 | 7.6 | 4 | 3 |
|  | 30 | Water dispersion 30 | Polyester resin P2 | Surface OTS-treated titanium oxide ("CR50" available from DAITO KASEI KOGYO CO., LTD.) | 310 | 7.9 | 4 | 4 |
|  | 31 | Water dispersion 31 | Polyester resin P3 | Surface OTS-treated titanium oxide ("CR50" available from DAITO KASEI KOGYO CO., LTD.) | 303 | 7.4 | 4 | 4 |
|  | 32 | Water dispersion 32 | Polyester resin P4 | Surface OTS-treated titanium oxide ("CR50" available from DAITO KASEI KOGYO CO., LTD.) | 298 | 7.5 | 5 | 4 |
|  | 33 | Water dispersion 33 | Polyester resin P5 | Surface OTS-treated titanium oxide ("CR50" available from DAITO KASEI KOGYO CO., LTD.) | 296 | 7.6 | 5 | 5 |
|  | 34 | Water dispersion 34 | Polyester resin P6 | Surface OTS-treated titanium oxide ("CR50" available from DAITO KASEI KOGYO CO., LTD.) | 305 | 7.7 | 5 | 4 |

TABLE 4-continued

| | | Polyester Resin | Pigment | Average particle size (nm) | pH | Dispersion stability | Redispersibility after long-term storage |
|---|---|---|---|---|---|---|---|
| 35 | Water dispersion 35 | Polyester resin P7 | Surface OTS-treated titanium oxide ("CR50" available from DAITO KASEI KOGYO CO., LTD.) | 319 | 7.6 | 3 | 3 |
| 36 | Water dispersion 36 | Polyester resin P5 | Titanium oxide ("CR80" available from ISHIHARA SANGYO KAISHA, LTD.) | 298 | 7.9 | 3 | 5 |
| 37 | Water dispersion 37 | Polyester resin P5 | C.I. Pigment Blue 27 ("MILORI BLUE FX-9050" available from Dainichiseika Color & Chemicals Mfg. Co., Ltd.) | 125 | 7.8 | 4 | 5 |
| 38 | Water dispersion 38 | Polyester resin P5 | Iron oxide ("TM Red 8270" available from Dainichiseika Color & Chemicals Mfg. Co., Ltd.) | 136 | 8.0 | 3 | 5 |
| 39 | Water dispersion 39 | Polyester resin P8 | Surface OTS-treated titanium oxide ("CR50" available from DAITO KASEI KOGYO CO., LTD.) | 329 | 7.5 | 4 | 3 |
| 40 | Water dispersion 40 | Polyester resin P9 | Surface OTS-treated titanium oxide ("CR50" available from DAITO KASEI KOGYO CO., LTD.) | 299 | 7.8 | 4 | 4 |
| 41 | Water dispersion 41 | Polyester resin P10 | Surface OTS-treated titanium oxide ("CR50" available from DAITO KASEI KOGYO CO., LTD.) | 301 | 7.7 | 4 | 4 |
| 42 | Water dispersion 42 | Polyester resin P11 | Surface OTS-treated titanium oxide ("CR50" available from DAITO KASEI KOGYO CO., LTD.) | 289 | 7.8 | 5 | 4 |
| 43 | Water dispersion 43 | Polyester resin P12 | Surface OTS-treated titanium oxide ("CR50" available from DAITO KASEI KOGYO CO., LTD.) | 286 | 7.6 | 5 | 5 |

TABLE 4-continued

| | | Polyester Resin | Pigment | Average particle size (nm) | pH | Dispersion stability | Redispersibility after long-term storage |
|---|---|---|---|---|---|---|---|
| 44 | Water dispersion 44 | Polyester resin P13 | Surface OTS-treated titanium oxide ("CR50" available from DAITO KASEI KOGYO CO., LTD.) | 291 | 7.4 | 5 | 4 |
| 45 | Water dispersion 45 | Polyester resin P14 | Surface OTS-treated titanium oxide ("CR50" available from DAITO KASEI KOGYO CO., LTD.) | 305 | 7.6 | 4 | 3 |
| 46 | Water dispersion 46 | Polyester resin P12 | Titanium oxide ("CR80" available from ISHIHARA SANGYO KAISHA, LTD.) | 289 | 7.8 | 3 | 4 |
| 47 | Water dispersion 47 | Polyester resin P12 | C.I. Pigment Blue 27 ("MILORI BLUE FX-9050" available from Dainichiseika Color & Chemicals Mfg. Co., Ltd.) | 123 | 7.6 | 4 | 4 |
| 48 | Water dispersion 48 | Polyester resin P12 | Iron oxide ("TM Red 8270" available from Dainichiseika Color & Chemicals Mfg. Co., Ltd.) | 145 | 7.7 | 3 | 4 |
| 49 | Water dispersion 49 | Polyester resin P15 | Surface OTS-treated titanium oxide ("CR50" available from DAITO KASEI KOGYO CO., LTD.) | 296 | 7.8 | 4 | 3 |
| 50 | Water dispersion 50 | Polyester resin P16 | Surface OTS-treated titanium oxide ("CR50" available from DAITO KASEI KOGYO CO., LTD.) | 284 | 7.8 | 5 | 5 |
| 51 | Water dispersion 51 | Polyester resin P17 | Surface OTS-treated titanium oxide ("CR50" available from DAITO KASEI KOGYO CO., LTD.) | 297 | 7.6 | 4 | 4 |
| 52 | Water dispersion 52 | Polyester resin P18 | Surface OTS-treated titanium oxide ("CR50" available from DAITO KASEI KOGYO CO., LTD.) | 324 | 7.9 | 3 | 3 |

TABLE 4-continued

|  |  | Polyester Resin | Pigment | Average particle size (nm) | pH | Dispersion stability | Redispersibility after long-term storage |
|---|---|---|---|---|---|---|---|
| Comparative Example 2 | Comparative water dispersion 2 | Polyester resin CP1 | Surface OTS-treated titanium oxide ("CR50" available from DAITO KASEI KOGYO CO., LTD.) | 342 | 7.3 | 2 | 2 |

From Tables 3 and 4, it was confirmed that the pigment water dispersions obtained in the Examples were excellent in dispersion stability and re-dispersibility after long-term storage as compared to the pigment water dispersions obtained in the Comparative Examples.

Examples 53 to 104 and Comparative Examples 3 and 4 (Production of Water-Based Inks 1 to 52, 103 and 104)

The respective components including each of the pigment water dispersions 1 to 52 and comparative water dispersions 1 and 2 of the pigment-containing resin particles obtained in Examples 1 to 52 and Comparative Examples 1 and 2, respectively, were mixed with each other in such a compounding ratio as shown in Tables 5 and 6. The resulting mixed solution was subjected to filtration treatment through a membrane filter "Minisart" (tradename) having a pore size of 5 μm, thereby obtaining water-based inks 1 to 52, 103 and 104 (solid content: 6.7%; pigment content: 4.0%; polyester resin content: 2.7%).

Incidentally, the details of the respective components shown in Tables 5 and 6 are as follows.

iBDG: Diethylene glycol monoisobutyl ether
PG: Propylene glycol
KF-6011: Alkylene glycol-modified polydimethylsiloxane "KF-6011" (tradename) available from Shin-Etsu Chemical Co., Ltd.

The resulting water-based inks were evaluated with respect to continuous ejection properties after long-term storage or filtration velocity after long-term storage as well as substrate-adhesion properties, rub fastness and solvent (ethanol) resistance by the following methods. The results are shown in Tables 5 and 6.

Evaluation of Continuous Ejection Properties after Long-Term Storage

The respective water-based inks were stored in a hermetically sealed condition at 25° C. for 6 months to prepare long-term stored water-based inks. Then, the thus-prepared respective long-term stored water-based inks were loaded into an ink-jet printer "IPSIO SG 2010L" (tradename) available from Ricoh Company, Ltd., equipped with a rubber heater, and a solid image was printed using the ink-jet printer on a polyethylene terephthalate (PET) film "LUMIRROR (trademark) T60 #75" (tradename; water absorption: 2.3 g/m$^2$) available from Toray Industries Inc., which had been heated to 60° C. This printing procedure was repeated 100 times in which the printed materials obtained at 30th, 50th and 100th printing operations were visually observed to examine whether or not any thin spots, etc., occurred in the printed image. The continuous ejection properties after long-term storage of the respective water-based inks were evaluated according to the following evaluation ratings.

Evaluation Ratings

5: No thin spots were recognized in the printed image even on the 100th printed material.
4: Slight thin spots were recognized on the 100th printed material.
3: Thin spots were apparently recognized on the 100th or subsequent printed materials.
2: Thin spots were recognized on the 50th or subsequent printed materials.
1: Thin spots were recognized on the 30th or subsequent printed materials.

If the evaluation result was the rank 3, 4 or 5, the water-based ink was sufficient in continuous ejection properties.

Evaluation of Filtration Velocity after Long-Term Storage

An open container was mounted to a membrane filter "Minisart" (tradename) having a pore size of 5 μm available from Sartorius Inc., and 50.0 g of each of the water-based inks that had been allowed to stand at room temperature for 6 months (long-term retained inks 3) was charged into the container to measure the time required from immediately after initiating charging of the ink until a whole amount of the ink was allowed to pass through the membrane filter (whole ink pass-through time).

Evaluation Ratings

5: The whole ink pass-through time was less than 15 minutes.
4: The whole ink pass-through time was not less than 15 minutes and less than 30 minutes.
3: The whole ink pass-through time was not less than 30 minutes and less than 45 minutes.
2: The whole ink pass-through time was not less than 45 minutes and less than 60 minutes.
1: The whole amount of the ink failed to pass through the membrane filter even after the elapse of 60 minutes.

If the evaluation result was the rank 3, 4 or 5, the filtration velocity of the ink was in an acceptable level.

Evaluation of Substrate-Adhesion Properties

The respective water-based inks were loaded into an ink-jet printer "IPSIO SG 2010L" (tradename) available from Ricoh Company, Ltd., equipped with a rubber heater, and a solid image was printed using the ink-jet printer on a polyethylene terephthalate (PET) film "LUMIRROR T60 #75" (tradename) which had been heated to 60° C. The resulting printed material was placed on a hot plate heated to 60° C. and dried thereon for 3 minutes, and then cooled to 25° C., thereby obtaining a polyethylene terephthalate film printed material for evaluation. The resulting printed material was used to evaluate substrate-adhesion properties of the ink by a cross-cut adhesion testing method according to JIS K5400.

More specifically, the printed surface of the polyethylene terephthalate film printed material for evaluation of substrate-adhesion properties of the ink was cut along 11 cut lines in each of the longitudinal and lateral directions of the printed material by a cutter knife until a cut depth of the cutter knife reached a base material of a printing medium of the printed material to thereby form 100 crosscuts on the printed surface. Then, a cellophane tape was strongly attached onto a crosscut-formed portion of the printed surface, and rapidly peeled off at a peel angle of 45° from an edge of the attached tape, and the condition of the crosscuts was compared with that before the test to thereby evaluate substrate-adhesion properties of the respective water-based inks according to the following evaluation ratings.

Evaluation Ratings

5: Not less than 90% of an entire area of the crosscut-formed portion of the printed surface remained unpeeled.
4: Not less than 80% and less than 90% of an entire area of the crosscut-formed portion of the printed surface remained unpeeled.
3: Not less than 50% and less than 80% of an entire area of the crosscut-formed portion of the printed surface remained unpeeled.
2: Not less than 30% and less than 50% of an entire area of the crosscut-formed portion of the printed surface remained unpeeled.
1: Less than 30% of an entire area of the crosscut-formed portion of the printed surface remained unpeeled.

If the evaluation result was the rank 3, 4 or 5, the water-based ink had sufficient substrate-adhesion properties.

Evaluation of Rub Fastness

The printed surface of the same printed material as used above for evaluation of substrate-adhesion properties of the ink was rubbed with a cellulose nonwoven fabric "BEMCOT (trademark) M3-II" (tradename) available from Asahi Kasei Fiber K.K., by reciprocatively moving the nonwoven fabric over the printed surface 50 times while applying a load of 100 g/cm$^2$ thereto. The printed surface after being rubbed with the nonwoven fabric was visually observed to examine whether or not any damage (flaws) occurred thereon, and the rub fastness of the printed material was evaluated according to the following evaluation ratings.

Evaluation Ratings

5: No flaws were present on the printed surface, and no deterioration in gloss was recognized.
4: No flaws were present on the printed surface, but deterioration in gloss was recognized by visual observation.
3: Flaws were present on the printed surface, but the surface of the underlying film was not exposed thereto.
2: The printed surface suffered from peeling, and the surface of the underlying film was exposed thereto such that an area of the exposed surface of the film was less than 50% of the printed image portion.
1: The printed surface suffered from peeling, and the surface of the underlying film was exposed thereto such that an area of the exposed surface of the film was not less than 50% of the printed image portion.

It was indicated that as the rank value of the evaluation rating as described above was increased, the flaws formed on the printed surface was reduced, and the printed material was more excellent in rub fastness. If the evaluating result was the rank 3, 4 or 5, the printed material exhibited sufficient rub fastness.

Evaluation of Solvent (Ethanol) Resistance

The same printed material as used above for evaluation of substrate-adhesion properties of the ink was prepared.

In addition, aqueous ethanol solutions respectively having concentrations of from 10 to 100% by mass at the intervals of 5% by mass were also prepared.

The thus prepared respective aqueous ethanol solutions were impregnated into a Johnson's cotton bud available from Johnson & Johnson K.K., and the printed surface of the polyethylene terephthalate film printed material for the evaluation was rubbed with the cotton bud by reciprocatively moving the cotton bud over the printed surface 10 times while applying a load of 5 g thereto. The printed surface rubbed was observed to examine whether or not any change occurred thereon during the aforementioned test and measure a concentration of ethanol in the aqueous ethanol solution at which the printed surface no longer suffered from any change. The solvent resistance of the printed material was evaluated according to the following evaluation ratings.

Evaluation Ratings

5: The ethanol concentration was 100%.
4: The ethanol concentration was not less than 70% and less than 100%.
3: The ethanol concentration was not less than 50% and less than 70%.
2: The ethanol concentration was not less than 30% and less than 50%.
1: The ethanol concentration was less than 30%.

If the evaluating result was the rank 3, 4 or 5, the printed material exhibited sufficient solvent resistance.

TABLE 5

| | | Examples | | | | | | | | | | | | | | |
|---|---|---|---|---|---|---|---|---|---|---|---|---|---|---|---|---|
| | | 53 | 54 | 55 | 56 | 57 | 58 | 59 | 60 | 61 | 62 | 63 | 64 | 65 | 66 | 67 |
| Kind of water-based ink | | 1 | 2 | 3 | 4 | 5 | 6 | 7 | 8 | 9 | 10 | 11 | 12 | 13 | 14 | 15 |
| Water dispersion of pigment- | Water dispersion 1 | 30 | | | | | | | | | | | | | | |
| | Water dispersion 2 | | 30 | | | | | | | | | | | | | |
| | Water dispersion 3 | | | 30 | | | | | | | | | | | | |
| | Water dispersion 4 | | | | 30 | | | | | | | | | | | |

TABLE 5-continued

| | | | | | | | | | | | | | | | | |
|---|---|---|---|---|---|---|---|---|---|---|---|---|---|---|---|---|
| containing polyester resin particles | Water dispersion 5 | | | 30 | | | | | | | | | | | | |
| | Water dispersion 6 | | | | 30 | | | | | | | | | | | |
| | Water dispersion 7 | | | | | 30 | | | | | | | | | | |
| | Water dispersion 8 | | | | | | 30 | | | | | | | | | |
| | Water dispersion 9 | | | | | | | 30 | | | | | | | | |
| | Water dispersion 10 | | | | | | | | 30 | | | | | | | |
| | Water dispersion 11 | | | | | | | | | 30 | | | | | | |
| | Water dispersion 12 | | | | | | | | | | 30 | | | | | |
| | Water dispersion 13 | | | | | | | | | | | 30 | | | | |
| | Water dispersion 14 | | | | | | | | | | | | 30 | | | |
| | Water dispersion 15 | | | | | | | | | | | | | 30 | | |
| | Water dispersion 16 | | | | | | | | | | | | | | | |
| | Water dispersion 17 | | | | | | | | | | | | | | | |
| | Water dispersion 18 | | | | | | | | | | | | | | | |
| | Water dispersion 19 | | | | | | | | | | | | | | | |
| | Water dispersion 20 | | | | | | | | | | | | | | | |
| | Water dispersion 21 | | | | | | | | | | | | | | | |
| | Water dispersion 22 | | | | | | | | | | | | | | | |
| | Water dispersion 23 | | | | | | | | | | | | | | | |
| | Water dispersion 24 | | | | | | | | | | | | | | | |
| | Water dispersion 25 | | | | | | | | | | | | | | | |
| | Water dispersion 26 | | | | | | | | | | | | | | | |
| | Water dispersion 27 | | | | | | | | | | | | | | | |
| | Water dispersion 28 | | | | | | | | | | | | | | | |
| | Comparative water dispersion 1 | | | | | | | | | | | | | | | |
| | iBDG | 5 | 5 | 5 | 5 | 5 | 5 | 5 | 5 | 5 | 5 | 5 | 5 | 5 | 5 | 5 |
| | PG | 30 | 30 | 30 | 30 | 30 | 30 | 30 | 30 | 30 | 30 | 30 | 30 | 30 | 30 | 30 |
| | KF6011 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 |
| | Ion-exchanged water | *1 | *1 | *1 | *1 | *1 | *1 | *1 | *1 | *1 | *1 | *1 | *1 | *1 | *1 | *1 |
| Evaluation results | Average particle size (nm) | 97 | 95 | 93 | 96 | 92 | 95 | 97 | 90 | 98 | 153 | 152 | 101 | 99 | 94 | 95 |
| | pH | 7.8 | 7.5 | 7.4 | 7.7 | 7.3 | 7.9 | 7.6 | 7.4 | 7.5 | 7.8 | 7.6 | 7.5 | 7.5 | 7.6 | 7.5 |
| | Continuous ejection properties after long-term storage | 3 | 4 | 4 | 4 | 5 | 4 | 3 | 5 | 5 | 5 | 5 | 5 | 5 | 3 | 4 |
| | Substrate-adhesion properties | 4 | 5 | 5 | 5 | 5 | 5 | 4 | 5 | 5 | 5 | 5 | 5 | 5 | 5 | 4 |
| | Rub fastness | 4 | 4 | 4 | 5 | 5 | 5 | 1 | 5 | 5 | 5 | 5 | 5 | 3 | 4 | 5 |
| | Ethanol resistance | 3 | 4 | 5 | 5 | 5 | 4 | 4 | 5 | 5 | 5 | 5 | 5 | 4 | 4 | 5 |

| | | | Examples | | | | | | | | | | | | Com. |
|---|---|---|---|---|---|---|---|---|---|---|---|---|---|---|---|
| | | | 68 | 69 | 70 | 71 | 72 | 73 | 74 | 75 | 76 | 77 | 78 | 79 | 80 | Ex. 3 |
| | Kind of water-based ink | | 16 | 17 | 18 | 19 | 20 | 21 | 22 | 23 | 24 | 25 | 26 | 27 | 28 | 103 |
| Water dispersion of pigment-containing polyester resin particles | Water dispersion 1 | | | | | | | | | | | | | | | |
| | Water dispersion 2 | | | | | | | | | | | | | | | |
| | Water dispersion 3 | | | | | | | | | | | | | | | |
| | Water dispersion 4 | | | | | | | | | | | | | | | |
| | Water dispersion 5 | | | | | | | | | | | | | | | |
| | Water dispersion 6 | | | | | | | | | | | | | | | |
| | Water dispersion 7 | | | | | | | | | | | | | | | |
| | Water dispersion 8 | | | | | | | | | | | | | | | |
| | Water dispersion 9 | | | | | | | | | | | | | | | |
| | Water dispersion 10 | | | | | | | | | | | | | | | |
| | Water dispersion 11 | | | | | | | | | | | | | | | |
| | Water dispersion 12 | | | | | | | | | | | | | | | |
| | Water dispersion 13 | | | | | | | | | | | | | | | |
| | Water dispersion 14 | | | | | | | | | | | | | | | |
| | Water dispersion 15 | | | | | | | | | | | | | | | |
| | Water dispersion 16 | | 30 | | | | | | | | | | | | | |
| | Water dispersion 17 | | | 30 | | | | | | | | | | | | |
| | Water dispersion 18 | | | | 30 | | | | | | | | | | | |
| | Water dispersion 19 | | | | | 30 | | | | | | | | | | |
| | Water dispersion 20 | | | | | | 30 | | | | | | | | | |
| | Water dispersion 21 | | | | | | | 30 | | | | | | | | |
| | Water dispersion 22 | | | | | | | | 30 | | | | | | | |
| | Water dispersion 23 | | | | | | | | | 30 | | | | | | |
| | Water dispersion 24 | | | | | | | | | | 30 | | | | | |
| | Water dispersion 25 | | | | | | | | | | | 30 | | | | |
| | Water dispersion 26 | | | | | | | | | | | | 30 | | | |
| | Water dispersion 27 | | | | | | | | | | | | | 30 | | |
| | Water dispersion 28 | | | | | | | | | | | | | | 30 | |
| | Comparative water dispersion 1 | | | | | | | | | | | | | | | 30 |
| | iBDG | | 5 | 5 | 5 | 5 | 5 | 5 | 5 | 5 | 5 | 5 | 5 | 5 | 5 | 5 |
| | PG | | 30 | 30 | 30 | 30 | 30 | 30 | 30 | 30 | 30 | 30 | 30 | 30 | 30 | 30 |
| | KF6011 | | 0.5 | 0.5 | 0.5 | 0.5 | 0.5 | 0.5 | 0.5 | 0.5 | 0.5 | 0.5 | 0.5 | 0.5 | 0.5 | 0.5 |

TABLE 5-continued

|  |  |  | | | | | | | | | | | | | | |
|---|---|---|---|---|---|---|---|---|---|---|---|---|---|---|---|---|
|  | | Ion-exchanged water | *1 | *1 | *1 | *1 | *1 | *1 | *1 | *1 | *1 | *1 | *1 | *1 | *1 | *1 |
| Evaluation results | | Average particle size (nm) | 92 | 91 | 96 | 100 | 89 | 99 | 157 | 151 | 105 | 90 | 97 | 101 | 103 | 105 |
| | | pH | 7.7 | 7.4 | 7.5 | 7.4 | 7.5 | 7.6 | 7.5 | 7.6 | 7.6 | 7.5 | 7.5 | 7.5 | 7.5 | 7.4 |
| | | Continuous ejection properties after long-term storage | 4 | 5 | 4 | 3 | 5 | 5 | 5 | 5 | 5 | 5 | 4 | 3 | 3 | 2 |
| | | Substrate-adhesion properties | 5 | 5 | 5 | 4 | 5 | 5 | 5 | 5 | 5 | 5 | 4 | 4 | 4 | 2 |
| | | Rub fastness | 5 | 5 | 5 | 4 | 5 | 5 | 5 | 5 | 5 | 5 | 5 | 5 | 5 | 4 |
| | | Ethanol resistance | 5 | 5 | 5 | 4 | 5 | 5 | 5 | 5 | 5 | 5 | 5 | 5 | 5 | 3 |

Note:
*1: Balance

TABLE 6

| | | Examples | | | | | | | | | | | | |
|---|---|---|---|---|---|---|---|---|---|---|---|---|---|---|
| | | 81 | 82 | 83 | 84 | 85 | 86 | 87 | 88 | 89 | 90 | 91 | 92 | 93 |
| Kind of water-based ink | | 29 | 30 | 31 | 32 | 33 | 34 | 35 | 36 | 37 | 38 | 39 | 40 | 41 |
| Water dispersion of pigment containing polyester resin particles | Water dispersion 29 | 30 | | | | | | | | | | | | |
| | Water dispersion 30 | | 30 | | | | | | | | | | | |
| | Water dispersion 31 | | | 30 | | | | | | | | | | |
| | Water dispersion 32 | | | | 30 | | | | | | | | | |
| | Water dispersion 33 | | | | | 30 | | | | | | | | |
| | Water dispersion 34 | | | | | | 30 | | | | | | | |
| | Water dispersion 35 | | | | | | | 30 | | | | | | |
| | Water dispersion 36 | | | | | | | | 30 | | | | | |
| | Water dispersion 37 | | | | | | | | | 30 | | | | |
| | Water dispersion 38 | | | | | | | | | | 30 | | | |
| | Water dispersion 39 | | | | | | | | | | | 30 | | |
| | Water dispersion 40 | | | | | | | | | | | | 30 | |
| | Water dispersion 41 | | | | | | | | | | | | | 30 |
| | Water dispersion 42 | | | | | | | | | | | | | |
| | Water dispersion 43 | | | | | | | | | | | | | |
| | Water dispersion 44 | | | | | | | | | | | | | |
| | Water dispersion 45 | | | | | | | | | | | | | |
| | Water dispersion 46 | | | | | | | | | | | | | |
| | Water dispersion 47 | | | | | | | | | | | | | |
| | Water dispersion 48 | | | | | | | | | | | | | |
| | Water dispersion 49 | | | | | | | | | | | | | |
| | Water dispersion 50 | | | | | | | | | | | | | |
| | Water dispersion 51 | | | | | | | | | | | | | |
| | Water dispersion 52 | | | | | | | | | | | | | |
| | Comparative water dispersion 1 | | | | | | | | | | | | | |
| | iBDG | 5 | 5 | 5 | 5 | 5 | 5 | 5 | 5 | 5 | 5 | 5 | 5 | 5 |
| | PG | 30 | 30 | 30 | 30 | 30 | 30 | 30 | 30 | 30 | 30 | 30 | 30 | 30 |
| | KF6011 | 0.5 | 0.5 | 0.5 | 0.5 | 0.5 | 0.5 | 0.5 | 0.5 | 0.5 | 0.5 | 0.5 | 0.5 | 0.5 |
| | Ion-exchanged water | *1 | *1 | *1 | *1 | *1 | *1 | *1 | *1 | *1 | *1 | *1 | *1 | *1 |
| Evaluation results | Average particle size (nm) | 325 | 310 | 308 | 298 | 296 | 305 | 319 | 298 | 125 | 136 | 329 | 299 | 301 |
| | pH | 7.6 | 7.9 | 7.4 | 7.5 | 7.6 | 7.7 | 7.6 | 7.9 | 7.8 | 8 | 7.5 | 7.8 | 7.7 |
| | Filtration velocity after long-term storage | 3 | 4 | 4 | 4 | 5 | 4 | 3 | 4 | 4 | 4 | 3 | 4 | 1 |
| | Substrate-adhesion properties | 4 | 4 | 5 | 5 | 5 | 5 | 4 | 3 | 4 | 4 | 4 | 4 | 5 |
| | Rub fastness | 3 | 4 | 4 | 5 | 5 | 5 | 3 | 4 | 3 | 3 | 3 | 4 | 4 |
| | Ethanol resistance | 4 | 5 | 5 | 5 | 5 | 5 | 4 | 3 | 4 | 3 | 3 | 5 | 5 |

| | | Examples | | | | | | | | | | Com. |
|---|---|---|---|---|---|---|---|---|---|---|---|---|
| | | 94 | 95 | 96 | 97 | 98 | 99 | 100 | 101 | 102 | 103 | 104 | Ex. 4 |
| Kind of water-based ink | | 42 | 43 | 44 | 45 | 46 | 47 | 48 | 49 | 50 | 51 | 52 | 104 |
| Water dispersion of pigment containing polyester resin particles | Water dispersion 29 | | | | | | | | | | | | |
| | Water dispersion 30 | | | | | | | | | | | | |
| | Water dispersion 31 | | | | | | | | | | | | |
| | Water dispersion 32 | | | | | | | | | | | | |
| | Water dispersion 33 | | | | | | | | | | | | |
| | Water dispersion 34 | | | | | | | | | | | | |
| | Water dispersion 35 | | | | | | | | | | | | |
| | Water dispersion 36 | | | | | | | | | | | | |
| | Water dispersion 37 | | | | | | | | | | | | |
| | Water dispersion 38 | | | | | | | | | | | | |

TABLE 6-continued

| | | 42 | 43 | 44 | 45 | 46 | 47 | 48 | 49 | 50 | 51 | 52 | Comp1 |
|---|---|---|---|---|---|---|---|---|---|---|---|---|---|
| | Water dispersion 39 | | | | | | | | | | | | |
| | Water dispersion 40 | | | | | | | | | | | | |
| | Water dispersion 41 | | | | | | | | | | | | |
| | Water dispersion 42 | 30 | | | | | | | | | | | |
| | Water dispersion 43 | | 30 | | | | | | | | | | |
| | Water dispersion 44 | | | 30 | | | | | | | | | |
| | Water dispersion 45 | | | | 30 | | | | | | | | |
| | Water dispersion 46 | | | | | 30 | | | | | | | |
| | Water dispersion 47 | | | | | | 30 | | | | | | |
| | Water dispersion 48 | | | | | | | 30 | | | | | |
| | Water dispersion 49 | | | | | | | | 30 | | | | |
| | Water dispersion 50 | | | | | | | | | 30 | | | |
| | Water dispersion 51 | | | | | | | | | | 30 | | |
| | Water dispersion 52 | | | | | | | | | | | 30 | |
| | Comparative water dispersion 1 | | | | | | | | | | | | 30 |
| | iBDG | 5 | 5 | 5 | 5 | 5 | 5 | 5 | 5 | 5 | 5 | 5 | 5 |
| | PG | 30 | 30 | 30 | 30 | 30 | 30 | 30 | 30 | 30 | 30 | 30 | 30 |
| | KF6011 | 0.5 | 0.5 | 0.5 | 0.5 | 0.5 | 0.5 | 0.5 | 0.5 | 0.5 | 0.5 | 0.5 | 0.5 |
| | Ion-exchanged water | *1 | *1 | *1 | *1 | *1 | *1 | *1 | *1 | *1 | *1 | *1 | *1 |
| Evaluation results | Average particle size (nm) | 289 | 286 | 291 | 305 | 289 | 123 | 145 | 296 | 284 | 297 | 324 | 342 |
| | pH | 7.8 | 7.6 | 7.4 | 7.6 | 7.8 | 7.6 | 7.7 | 7.8 | 7.8 | 7.6 | 7.9 | 7.3 |
| | Filtration velocity after long-term storage | 4 | 5 | 4 | 3 | 4 | 4 | 4 | 3 | 5 | 1 | 3 | 1 |
| | Substrate-adhesion properties | 5 | 5 | 5 | 4 | 3 | 4 | 4 | 3 | 5 | 4 | 4 | 2 |
| | Rub fastness | 5 | 5 | 4 | 3 | 4 | 3 | 3 | 3 | 5 | 5 | 4 | 3 |
| | Ethanol resistance | 5 | 5 | 5 | 4 | 3 | 4 | 3 | 4 | 5 | 5 | 5 | 3 |

Note:
*1: Balance

From Tables 5 and 6, it was confirmed that the water-based inks obtained in the Examples were excellent in continuous ejection properties after long-term storage or filterability after long-term storage, and dispersion stability upon long-term storage as compared to the water-based inks obtained in the Comparative Examples. In addition, it was also confirmed that the water-based inks obtained in the Examples were capable of providing a printed material that was excellent in substrate-adhesion properties, rub fastness, and solvent resistance when used for ink-jet printing, as compared to the water-based inks obtained in the Comparative Examples.

INDUSTRIAL APPLICABILITY

According to the present invention, it is possible to obtain a pigment water dispersion that is excellent in dispersion stability, and re-dispersibility after long-term storage. The water-based ink containing the aforementioned pigment water dispersion according to the present invention is excellent in long-term dispersion stability, and is capable of providing a printed material that is excellent in substrate-adhesion properties, rub fastness, and solvent resistance, and is therefore useful, in particular, for printing on a low-liquid absorbing coated paper or a non-liquid absorbing resin film, etc.

The invention claimed is:

1. A pigment water dispersion, comprising:
pigment-containing polyester resin particles,
wherein the polyester resin comprises a constitutional unit derived from an alcohol component and a constitutional unit derived from a carboxylic acid component,
wherein the alcohol component comprises 3-methyl-1,5-pentanediol,
wherein an average particle size of the pigment-containing resin particles is not less than 60 nm and not more than 350 nm,
wherein a mass ratio of the pigment to the pigment-containing polyester resin particles (pigment/pigment-containing polyester resin particles) is 0.2 or more and 0.7 or less.

2. The pigment water dispersion according to claim 1, wherein an acid value of the polyester resin is not less than 10 mgKOH/g and not more than 100 mgKOH/g.

3. The pigment water dispersion according to claim 1, wherein a glass transition temperature of the polyester resin is not lower than 35° C. and not higher than 100° C.

4. The pigment water dispersion according to claim 1, wherein the alcohol component further comprises at least one compound selected from the group consisting of an aromatic diol, an aliphatic diol and an alicyclic diol.

5. The pigment water dispersion according to claim 1, wherein the carboxylic acid component comprises an aromatic dicarboxylic acid.

6. The pigment water dispersion according to claim 1, wherein a content of the pigment in the pigment water dispersion is not less than 2% by mass and not more than 20% by mass.

7. A water-based ink comprising the pigment water dispersion according to claim 1, and a water-soluble organic solvent.

8. An ink-jet printing ink, comprising the water-based ink according to claim 7.

9. A process for producing a water-based ink, comprising mixing the pigment water dispersion according to claim 1 and a water-soluble organic solvent.

10. The pigment water dispersion according to claim 1, wherein a content of 3-methyl-1,5-pentanediol in the alcohol component is not less than 5 mol % and not more than 95 mol %.

11. The pigment water dispersion according to claim 1, wherein a content of 3-methyl-1,5-pentanediol in the alcohol component is not less than 20 mol % and not more than 70 mol %.

12. The pigment water dispersion according to claim 1, wherein the carboxylic acid component is at least one compound selected from the group consisting of an aromatic dicarboxylic acid, an aliphatic dicarboxylic acid, an alicyclic dicarboxylic acid, and a trivalent or higher-valent polycarboxylic acid.

13. The pigment water dispersion according to claim 12, wherein the aromatic dicarboxylic acid is at least one compound selected from the group consisting of phthalic acid, isophthalic acid, and terephthalic acid.

14. The pigment water dispersion according to claim 12, wherein the trivalent or higher-valent polycarboxylic acid is at least one compound selected from the group consisting of trimellitic acid and pyromellitic acid, and trimellitic anhydride.

15. The pigment water dispersion according to claim 12, wherein the carboxylic acid component is a combination of an aromatic dicarboxylic acid and a trivalent or higher-valent polycarboxylic acid.

16. The pigment water dispersion according to claim 4, wherein the aromatic diol is an alkyleneoxide adduct of bisphenol A.

17. The pigment water dispersion according to claim 4, wherein the aliphatic diol is at least one compound selected from the group consisting of 1,2-propanediol, 2,3-butanediol, 2,4-pentanediol, 2,5-hexanediol, 2,6-heptanediol, and 2,7-octanediol.

18. The pigment water dispersion according to claim 4, wherein the alicyclic diol is at least one compound selected from the group consisting of 1,4-cyclohexanediol and 1,4-cyclohexanedimethanol.

19. The pigment water dispersion according to claim 1, wherein the alcohol component further comprises at least one compound selected from the group consisting of 1,4-cyclohexanediol and 1,4-cyclohexanedimethanol, and
    a content of the at least one compound in the alcohol component is not less than 5 mol % and not more than 96 mol %.

20. The pigment water dispersion according to claim 1, wherein the polyester resin contains a carboxy group derived from the carboxylic acid component, and the carboxy group is at least partially neutralized with a neutralizing agent.

21. The pigment water dispersion according to claim 1, wherein a softening point of the polyester resin is not lower than 90° C. and not higher than 180° C.

22. The pigment water dispersion according to claim 1, wherein a weight-average molecular weight of the polyester resin is not less than 5,000 and not more than 100,000.

* * * * *